US012212062B2

(12) United States Patent
Hussain

(10) Patent No.: US 12,212,062 B2
(45) Date of Patent: Jan. 28, 2025

(54) LOW PROFILE ANTENNA SYSTEM FOR INTERNET OF SPACE THINGS CubeSat APPLICATIONS

(71) Applicant: KING FAHD UNIVERSITY OF PETROLEUM AND MINERALS, Dhahran (SA)

(72) Inventor: Rifaqat Hussain, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 148 days.

(21) Appl. No.: 18/317,973

(22) Filed: May 16, 2023

(65) Prior Publication Data

US 2024/0388006 A1 Nov. 21, 2024

(51) Int. Cl.

| | |
|---|---|
| ***H01Q 21/24*** | (2006.01) |
| ***H01Q 1/28*** | (2006.01) |
| ***H01Q 13/10*** | (2006.01) |
| ***H01Q 21/00*** | (2006.01) |

(52) U.S. Cl.

CPC ......... *H01Q 21/0006* (2013.01); *H01Q 1/288* (2013.01); *H01Q 13/106* (2013.01); *H01Q 21/0087* (2013.01); *H01Q 21/24* (2013.01)

(58) Field of Classification Search

CPC .. H01Q 21/0006; H01Q 1/288; H01Q 13/106; H01Q 21/0087; H01Q 21/24

See application file for complete search history.

(56) References Cited

U.S. PATENT DOCUMENTS 11,450,968 B1 9/2022 Hussain et al.

FOREIGN PATENT DOCUMENTS

CN 202352833 U 7/2012
IN 202041053483 12/2020

OTHER PUBLICATIONS

Yeonjeong et al. ; A Compact Four-Port Coplanar Antenna Based on an Excitation Switching Reconfigurable Mechanism for Cognitive Radio Applications ; MDPI applied sciences ; Aug. 2, 2019 ; 16 Pages.

Kumar et al. ; A Compact Novel Three-Port Integrated Wide and Narrow Band Antennas System for Cognitive Radio Applications ; Hindawi Publishing Corporation ; International Journal of Antennas and Propagation, vol. 2016 ; Sep. 20, 2016 ; 15 Pages.

*Primary Examiner* — Graham P Smith

(74) *Attorney, Agent, or Firm* — Oblon, McClelland, Maier & Neustadt, L.L.P.

(57) ABSTRACT

A three element slot-based antenna which includes a dielectric circuit board, a metallic layer, a sensing antenna, a first narrow band antenna, a second narrow band antenna, a first tapered transmission line, a second tapered transmission line, a first microstrip transmission line and a second microstrip transmission line. The sensing antenna is a semi-hexagonal slot-line loop whereas each of the first narrow band antenna and the second narrow band antenna are formed as a semi-elliptical slot-line loop having an E-shaped base in the metallic layer. The first tapered transmission line and the second tapered transmission line is connected to first feed port and second feed port, respectively. The first microstrip transmission line and the second microstrip transmission line are connected to third feed port and fourth feed port, respectively. The antenna resonates with circular polarization in an ultra-high frequency sub-GHz responsive to input signal at each feed port.

20 Claims, 15 Drawing Sheets

LOW PROFILE ANTENNA SYSTEM FOR INTERNET OF SPACE THINGS CubeSat APPLICATIONS

BACKGROUND

Technical Field

The present disclosure is directed to a low profile antenna system for internet of space things CubeSat applications.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Due to intensive internet usage and increased demand for network capacity, a flexible communication system is required in order to provide data communication at a high rate. During disasters, the flexible communication system acts as a global, scalable, flexible, and robust communication solution that can monitor remote areas and provide network coverage to underserved or disturbed regions. Satellite communication is a high-speed wireless communication system with high transmission capacity. Recent developments have led to smaller, lighter, and simpler satellite systems, such as pico-class satellites or cube satellites (CubeSats). CubeSats have gained widespread popularity due to their miniaturized size and economic benefits over traditional satellites. CubeSats are economical and easy to manufacture as compared to traditional satellites. CubeSat has proven its advantages in various fields, such as the RainCube precipitation radar, the Internet of Space Things (IoST), space exploration, rural communication, and remote sensing. The antenna is one of the most important elements in any communication system. Since more than one antenna is required in CubeSats, different antennas operating at individual frequencies are placed around the satellite body, ensuring that one antenna does not affect the performance of an adjacent antenna. It is challenging to accommodate different antennas on the CubeSat, as the CubeSat standard has size and mass restrictions while exhibiting high gain.

Since CubeSats have become increasingly used for IoST applications, the limited spectrum band at the ultra-high frequency (UHF) and very high frequency should be efficiently utilized to be sufficient for different applications of CubeSats. To solve the connection problems between multiple CubeSats, cognitive radio (CR) has a potential solution. CR has been used as an enabling technology for efficient, dynamic, and flexible spectrum utilization. In CR communication, a transceiver is capable of discerning between channels that are underutilized. CR avoids occupied channels and rapidly enters vacated channels without interfering with licensed user(s). Thus, CRs are a class of intelligent transceivers with an increased level of situational awareness due to their cognitive skills, resulting in an improvement in efficient, robust use of communication resources and the reduced delay in data exchange in a CubeSat constellation. Also, the use of CubeSat also extends to serve low-data-rate links for telecommand, telemetry, and control data for 5G networks at very high frequency (VHF), and ultra-high frequency (UHF).

An existing integrated antenna for cognitive radio communication in 5G, WLAN, LTE, and ITU bands has been described, that includes an ultra-wideband (UWB) antenna to monitor the radio spectrum and two narrow-band antennas for performing communication. The UWB antenna is suitable for sensing the unlicensed UWB of 3.1-10.6 GHZ. [See: S. Lakrit, A. Nella, S. Das, B. T. P. Madhav, and C. Murali Krishna, "*An integrated three-antenna structure for 5G, WLAN, LTE and ITU band cognitive radio communication*," AEU-International Journal of Electronics and Communications, vol. 139, p. 153906, 2021, incorporated herein by reference in its entirety].

An existing frequency-reconfigurable antenna for cognitive radio applications in the sub-6 GHz 5G band has been described. The antenna includes a wideband (WB) monopole integrated with a narrowband microstrip patch on a single-layer substrate. Two PIN diodes are employed to switch between the wideband (WB) sensing mode and the narrowband (NB) communication mode. Three varactor diodes are implemented on the narrowband microstrip patch to continuously tune the operating frequencies in the NB mode. The proposed antenna produces a wide bandwidth of 54.2% (3.19-5.56 GHz) for the sensing mode and a continuously tunable bandwidth of 44% (3.4-5.32 GHZ) for the communication mode. [See: T. K. Nguyen, C. D. Bui, A. Narbudowicz, and N. Nguyen-Trong, "*Frequency-Reconfigurable Antenna with Wide-and Narrow-band Modes for sub*-6 *GHz Cognitive Radio*," IEEE Antennas and Wireless Propagation Letters, pp. 1-5, 2022, doi: 10.1109/LAWP.2022.3201969, incorporated herein by reference in its entirety]. However, these conventional antennas need additional complex biasing circuitry to control the diode, which increases the cost and reduces the antenna efficiency. These conventional antennas are incompatible with CubeSat in terms of operating frequency, size, and compatibility.

Hence, there is a need for a slot-based antenna for use on cubic shaped satellites (CubeSat) communicating at ultra-high frequencies having compact size, wide operating bandwidth in UHF band, dual sense with polarization bandwidth reconfigurability, and good diversity performance.

SUMMARY

In an embodiment, a three element slot-based antenna for use on cubic shaped satellites (Cube-Sat) is described. The three element slot-based antenna includes a dielectric circuit board, a metallic layer, a sensing antenna, a first narrow band antenna, a second narrow band antenna, a first tapered transmission line, a second tapered transmission line, a first microstrip transmission line, and a second microstrip transmission line. The dielectric circuit board has a surface dimension of about 100 mm in length and about 100 mm in width, a top side, a bottom side, a first edge opposite a second edge, a third edge opposite a fourth edge, a first central axis extending from the first edge to the second edge, and a second central axis extending from the third edge to the fourth edge. The metallic layer covers the bottom side of the dielectric circuit board. The sensing antenna is located between the second central axis and the second edge. A base of the sensing antenna is parallel to the second central axis and an apex of the sensing antenna points towards the second edge. The sensing antenna is configured as a semi-hexagonal slot-line loop etched into the metallic layer. The first narrow band antenna is located between the first edge and the second central axis and between the third edge and the first central axis. The first narrow band antenna is configured as a semi-elliptical slot-line loop having an E-shaped base etched into the metallic layer. The second narrow band antenna is located between the first edge and the second central axis and between the first central axis and the fourth edge. The second narrow band antenna is configured as a semi-elliptical slot-line loop having an E-shaped base etched into the metallic layer. A gap is located in the base of the sensing antenna. The first central axis passes through the gap. A capacitor is located in the gap in the base of the sensing antenna. A first varactor diode is connected across a gap in an apex of the ellipse of the first narrow band antenna. A second varactor diode is connected across a gap in an apex of the ellipse of the second narrow band antenna. A first adjustable bias voltage source is operatively connected to the capacitor. A second adjustable bias voltage source is operatively connected to the first varactor diode. A third adjustable bias voltage source is operatively connected to the second varactor diode. The first tapered transmission line is located on the top side above the sensing antenna and between the third edge and the first central axis. A first end of the first tapered transmission line is connected to a first feed port and a second end of the first tapered transmission line is oriented towards the base of the semi-hexagonal shaped slot antenna. The second tapered transmission line located on the top side above the sensing antenna and between the fourth edge and the first central axis. A first end of the second tapered transmission line is connected to a second feed port and a second end of the second tapered transmission line is oriented towards the base of the semi-hexagonal shaped slot antenna. The first microstrip transmission line is located on the top side and extending from the first edge and above the E-shaped base of the first narrow band antenna. The first microstrip transmission line is connected to a third feed port. The second microstrip transmission line is located on the top side and extending from the fourth edge and above the E-shaped base of the second narrow band antenna. The second microstrip transmission line is connected to a fourth feed port. The three element slot-based antenna is configured to resonate with circular polarization in an ultra-high frequency sub-GHz range of about 570 MHz to about 950 MHz when an input signal is applied to each feed port.

In another exemplary embodiment, a method for transmitting ultra-high frequency signals with a three element slot-based antenna is described. The method includes connecting an input signal to each of a first port, a second port, a third port and a fourth feed port located on the three element slot-based antenna. The three element slot-based antenna includes a dielectric circuit board, a metallic layer, a sensing antenna, a first narrow band antenna, a second narrow band antenna, a first tapered transmission line, a second tapered transmission line, a first microstrip transmission line, and a second microstrip transmission line. The dielectric circuit board has a surface dimension of about 100 mm in length and about 100 mm in width, a top side, a bottom side, a first edge opposite a second edge, a third edge opposite a fourth edge, a first central axis extending from the first edge to the second edge, and a second central axis extending from the third edge to the fourth edge. The metallic layer covers the bottom side of the dielectric circuit board. The sensing antenna is located between the second central axis and the second edge. A base of the sensing antenna is parallel to the second central axis and an apex of the sensing antenna points towards the second edge. The sensing antenna is configured as a semi-hexagonal slot-line loop etched into the metallic layer. The first narrow band antenna is located between the first edge and the second central axis and between the third edge and the first central axis. The first narrow band antenna is configured as a semi-elliptical slot-line loop having an E-shaped base etched into the metallic layer. The second narrow band antenna is located between the first edge and the second central axis and between the first central axis and the fourth edge. The second narrow band antenna is configured as a semi-elliptical slot-line loop having an E-shaped base etched into the metallic layer. A gap is located in the base of the sensing antenna. The first central axis passes through the gap. A capacitor is located in the gap in the base of the sensing antenna. A first varactor diode is connected across a gap in an apex of the ellipse of the first narrow band antenna. A second varactor diode is connected across a gap in an apex of the ellipse of the second narrow band antenna. A first adjustable bias voltage source is operatively connected to the capacitor. A second adjustable bias voltage source is operatively connected to the first varactor diode. A third adjustable bias voltage source is operatively connected to the second varactor diode. The first tapered transmission line is located on the top side above the sensing antenna and between the third edge and the first central axis. A first end of the first tapered transmission line is connected to a first feed port and a second end of the first tapered transmission line is oriented towards the base of the semi-hexagonal shaped slot antenna. The second tapered transmission line located on the top side above the sensing antenna and between the fourth edge and the first central axis. A first end of the second tapered transmission line is connected to a second feed port and a second end of the second tapered transmission line is oriented towards the base of the semi-hexagonal shaped slot antenna. The first microstrip transmission line is located on the top side and extending from the first edge and above the E-shaped base of the first narrow band antenna. The first microstrip transmission line is connected to a third feed port. The second microstrip transmission line is located on the top side and extending from the fourth edge and above the E-shaped base of the second narrow band antenna. The second microstrip transmission line is connected to a fourth feed port. The three element slot-based antenna is configured to resonate with circular polarization in an ultra-high frequency sub-GHz range of about 570 MHz to about 950 MHz when an input signal is applied to each feed port. The method includes tuning the sensing antenna by adjusting the first adjustable bias voltage on the capacitor to cause the sensing antenna to achieve circular polarization in a bandwidth ranging from 0.57 GHz to 0.95 GHz. The method includes tuning the first narrow band antenna by adjusting the second adjustable bias voltage on the first varactor diode to achieve left hand elliptical polarization in the bandwidth ranging from 0.57 GHz to 0.95 GHz. The method includes tuning the second narrow band antenna by adjusting the third adjustable bias voltage on the second varactor diode to achieve right hand elliptical polarization in the bandwidth ranging from 0.57 GHz to 0.95 GHz.

In another exemplary embodiment, a method for forming a three element slot-based antenna for use on cubic shaped satellites (Cube-Sat) communicating at ultra-high frequencies is described. The method includes obtaining a dielectric circuit board having a surface dimension of about 100 mm in length and about 100 mm in width, a top side, a bottom side, a first edge opposite a second edge, a third edge opposite a fourth edge, a first central axis extending from the first edge to the second edge, and a second central axis extending from the third edge to the fourth edge. The method includes covering the bottom side of the dielectric circuit board with a metallic layer. The method includes etching a sensing antenna, by laser milling a semi-hexagonal slot-line loop into the metallic layer between the second central axis and the second edge, wherein a base of the semi-hexagonal slot-line loop is parallel to the second central axis and an apex of the semi-hexagonal slot-line loop points towards the second edge. The method includes etching a first narrow band antenna, by laser milling a first semi-elliptical slot-line loop having an E-shaped base into the metallic layer between the first edge and the second central axis and between the third edge and the first central axis, so that an apex of the first semi-ellipse points towards the second central axis. The method further includes etching a second narrow band antenna, by laser milling a second semi-elliptical slot-line loop having an E-shaped base into the metallic layer between the first edge and the second central axis and between the first central axis and the fourth edge, so that an apex of the second semi-ellipse points towards the first central axis. The method further includes connecting a capacitor across a gap in the base of the sensing antenna. The method further includes forming a first adjustable bias voltage circuit on the bottom side and operatively connecting the first adjustable bias voltage circuit to the capacitor through a first shorting post which extends from the top side to the metallic layer enclosed by the semi-hexagonal slot-line loop. The method further includes forming a second adjustable bias voltage circuit on the bottom side and operatively connecting the second adjustable bias voltage circuit to the first varactor through a second shorting post which extends from the top side to the metallic layer enclosed by the semi-elliptical slot-line loop having an E-shaped base of the first narrowband antenna. The method further includes forming a third adjustable bias voltage circuit on the bottom side and operatively connecting the third adjustable bias voltage circuit to the second varactor through a third shorting post which extends from the top side to the metallic layer enclosed by semi-elliptical slot-line loop having an E-shaped base of the second narrowband antenna. The method further includes printing a first tapered transmission line on the top side above the sensing antenna and between the third edge and the first central axis, wherein a second end of the first tapered transmission line is oriented towards the base of the semi-hexagonal shaped slot antenna. The method further includes connecting a first end of the first tapered transmission line to a first feed port. The method further includes depositing a second tapered transmission line on the top side above the sensing antenna and between the fourth edge and the first central axis, wherein a second end of the second tapered transmission line is oriented towards the base of the semi-hexagonal shaped slot antenna. The method further includes connecting a first end of the second tapered transmission line to a second feed port. The method further includes depositing a first microstrip transmission line on the top side, wherein the first microstrip transmission line extends from the first edge to above the E-shaped base of the first narrow band antenna. The method further includes connecting the first microstrip transmission line to a third feed port. The method further includes depositing a second microstrip transmission line located on the top side and extending from the fourth edge and above the E-shaped base of the second narrow band antenna, wherein the second microstrip transmission line is connected to a fourth feed port. The method further includes connecting the first feed port, the second feed port, the third feed port and the fourth feed port to an input signal.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
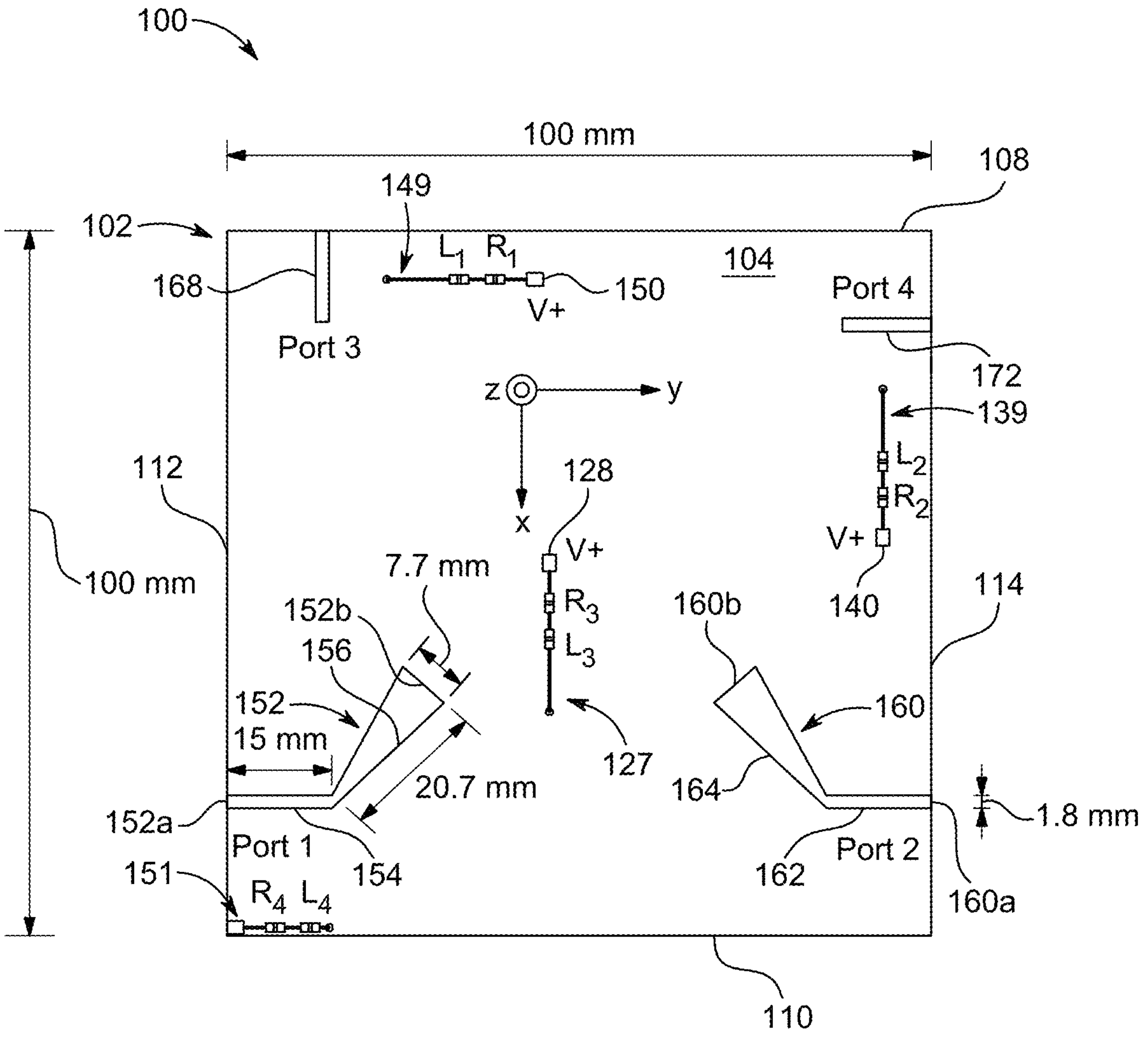
FIG. 1A is a top view of a three element slot-based antenna, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

CubeSats are increasingly used for Internet of Space Things (IoST) applications. Therefore, limited spectrum band at the ultra-high frequency (UHF) and very high frequency (VHF) is to be efficiently utilized such that the spectrum is sufficient for different applications of CubeSats. Cognitive radio (CR) has been used as an enabling technology for efficient, dynamic, and flexible spectrum utilization. Cognitive radio (CR) efficiently exploits the spectrum and minimizes interference between devices. Therefore, frequency-reconfigurable antennas (FRA) are desirable for CR such that a single antenna is configured to dynamically reconfigure to transmit and/or receive multiple frequency bands.

Aspects of this disclosure are directed to a low-profile miniaturized antenna for cognitive radio in IoST applications at the UHF band (frequencies between 300 MHz and 1 GHz). The antenna includes a circularly polarized wideband (WB) semi-hexagonal slot and two narrowband (NB) frequency-reconfigurable loop slots integrated into a single-layer substrate. The semi-hexagonal-shaped slot is excited by two orthogonal±45° tapered feed lines. The semi-hexagonal-shaped slot is loaded by a capacitor in order to achieve left hand circular polarization (LHCP) or right hand circular polarization (RHCP) in a wide bandwidth from 0.57 GHz to 0.95 GHz. Two NB frequency reconfigurable loop slots are tuned over a wide frequency band from 0.6 GHz to 1.05 GHz. The antenna tuning is achieved using a varactor diode integrated into each of the NB-frequency reconfigurable loop slots. The NB frequency reconfigurable loop slots are fabricated as meander loops in order to reduce their physical length and point out in different directions to achieve pattern diversity.

In various aspects of the disclosure, definitions of one or more terms that will be used in the document are provided below.

The term "decibel (or dB)" is a unit used to measure the ratio of input to a reference power. dB measures the intensity of the power level of an electrical signal by comparing it to a given scale. For example, an amplifier causes a gain in power measured in decibels and it is indicated by a positive number. In another example, cables can cause a loss of power. This is measured in negative dB.

The term "axial ratio (AR)" of an antenna is defined as the ratio between a major axis and a minor axis of a radiation pattern of a circularly polarized antenna. If an antenna has perfect circular polarization, then AR would be 1 (0 dB). However, if the antenna has an elliptical polarization, then AR would be greater than 1 (>0 dB).

The term "frequency reconfigurable antenna" is defined as an antenna which can alter its frequency of operation dynamically.

The term "pattern diversity" refers to two or more co-located antennas with different radiation patterns. This type of diversity makes use of directional antennas that are usually physically separated by some (often short) distance. Collectively they are capable of discriminating a large portion of angle space and can provide a higher gain versus a single omnidirectional radiator.

The term "reflection coefficient" is defined as a parameter that quantifies how much of an electromagnetic wave is reflected by an impedance discontinuity in a transmission medium.

FIG. 1A-FIG. 1F illustrate an overall configuration of a three element slot-based antenna 100 for use on cubic shaped satellites (CubeSat) communicating at ultra-high frequencies.

Figure 1B:
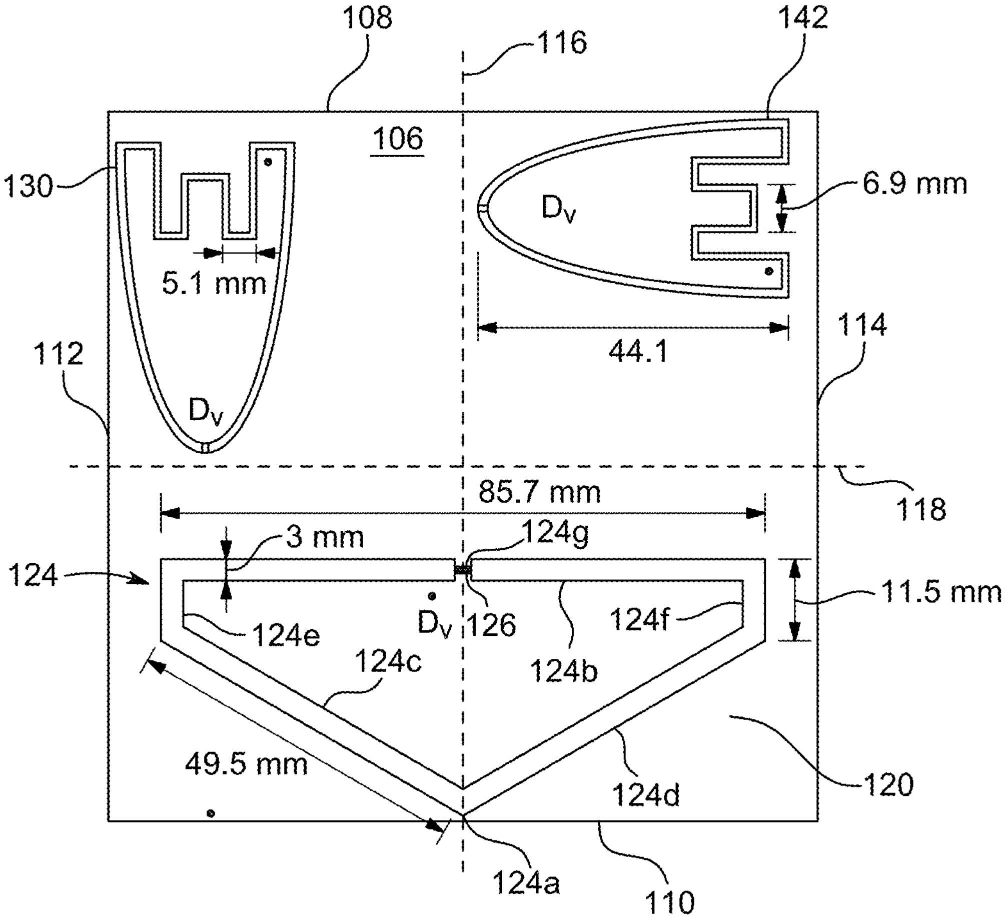
FIG. 1B is a bottom view of the three element slot-based antenna, according to certain embodiments.

FIG. 1A illustrates a bottom view (back view or back side) of the three element slot-based antenna 100 (hereinafter interchangeably referred to as "the antenna 100"). FIG. 1B is a top view (front view or front side) of the antenna 100. FIG. 1A-FIG. 1B may be read in conjunction with FIG. 1C-FIG. 1F for a better understanding. In the drawings of FIG. 1A-FIG. 1F, dimensions shown are for the example of a 100×100 $mm^2$ circuit board and should not be construed as limiting. For a circuit board less than 100×100 $mm^2$, the dimensions are proportionately smaller. Also, the dimensions are proportionately larger for a circuit board greater than 100×100 $mm^2$.

The antenna 100 includes a dielectric circuit board 102, a metallic layer 120, a sensing antenna, a first narrow band antenna 130, a second narrow band antenna 142, a first tapered transmission line 152, a second tapered transmission line 160, a first microstrip transmission line 168, and a second microstrip transmission line 172.

The dielectric circuit board 102 has a surface dimension of about 100 mm in length and about 100 mm in width. The dielectric circuit board 102 has a top side 104, a bottom side 106, a first edge 108, a second edge 110, a third edge 112, a fourth edge 114, a first central axis 116, and a second central axis 118. The first edge 108 is opposite to the second edge 110. The third edge 112 is opposite to the fourth edge 114. The first central axis 116 extends from the first edge 108 to the second edge 110. The second central axis 118 extends from the third edge 112 to the fourth edge 114. In an example, the dielectric circuit board 102 is a flame retardant (FR)-4 lossy dielectric plate. FR-4 (or FR4) is a glass-reinforced epoxy laminate material. FR-4 is a composite material composed of woven fiberglass cloth with an epoxy resin binder that is flame resistant (self-extinguishing). In an example, a thin layer of copper foil is typically laminated to one or both sides of the FR-4 lossy dielectric plate. In an example, the FR-4 substrate has a dielectric constant of 4.4, a loss tangent of 0.03, and a thickness of 0.76 mm.

The metallic layer 120 covers the bottom side 106 of the dielectric circuit board 102. For example, the metallic layer 120 is copper. The metallic layer 120 is grounded by connecting the metallic layer 120 to a first end of a ground terminal 151. A fourth resistor R4 is located on the bottom side 106. The fourth resistor R4 is connected in series with a second end of the ground terminal 151. A fourth inductor L4 is connected in series with the fourth resistor R4. The ground terminal 151 is connected to the fourth resistor R4 and the fourth inductor L4 as shown in FIG. 1A and FIG. 1E.

The sensing antenna (also known as semi-hexagonal shaped slot antenna or semi-hexagonal antenna) is located between the second central axis 118 and the second edge 110. The sensing antenna is configured as a semi-hexagonal slot-line loop 124 etched into the metallic layer 120.

Referring to FIG. 1B, the semi-hexagonal slot-line loop 124 includes an apex 124*a*, a base 124*b*, and a plurality of connected legs (124*c*-124*f*). The base 124*b* of the semi-hexagonal slot-line loop 124 is parallel to the second central axis 118. A gap 124*g* is located in the base 124*b* of the sensing antenna 124. The first central axis 116 passes through the gap 124*g*. A capacitor 126 is located in the gap 124*g* in the base 124*b* of the sensing antenna. An area enclosed by the semi-hexagonal slot-line loop 124 of the sensing antenna is also known as a first biased area. A first adjustable bias voltage source 128 located on the bottom side 106 is operatively connected to the capacitor 126. The first biased area is connected by a first shorting post 127 to the first adjustable bias voltage source 128. In an example, the first adjustable bias voltage source 128 is located on the bottom side and is operatively connected to the capacitor 126 through the first shorting post 127. A first adjustable bias voltage circuit is formed by the first shorting post 127 and the first adjustable bias voltage source 128. The first adjustable bias voltage circuit includes a first resistor R1 in series with a first inductor $L_1$. The first shorting post 127 extends from the top side 104 to the metallic layer 120 enclosed by the semi-hexagonal slot-line loop 124.

As shown in FIG. 1B, the plurality of connected legs (124*c*-124*f*) includes four legs having a first leg 124*c*, a second leg 124*d*, a third leg 124*e*, and a fourth leg 124*f*. The first leg 124*c* and the second leg 124*d* are connected to form the apex 124*a* of the semi-hexagonal antenna 122. The first leg 124*c* and the second leg 124*d* form an angle of about 90 degrees to 140 degrees at the apex 124*a*. The apex 124*a* is located near the second edge 110 and intersects the first central axis 116. The apex 124*a* of the sensing antenna points towards the second edge 110. The third leg 124*e* is connected to the first leg 124*c*. The third leg 124*e* is configured to form a first side of the semi-hexagonal antenna 122. The third leg 124*e* is parallel to the third edge 112. The fourth leg 124*f* is connected to the second leg 124*d*. The fourth leg 124*f* is configured to form a second side of the semi-hexagonal antenna 122. The fourth leg 122*f* is parallel to the fourth edge 114. The base 124*b* is connected between the third leg 124*e* and the fourth leg 124*f*.

In an aspect, the sensing antenna 124 (slot antenna) has a total length of 86 mm and a width of 32 mm.

Referring to FIG. 1A-FIG. 1B, the first narrow band antenna 130 is located between the first edge 108 and the second central axis 118 and between the third edge 112 and the first central axis 116. In an aspect, an apex of the first narrow band antenna 130 is located about 15.3 mm from the base 124*b* of the sensing antenna.

Figure 1C:
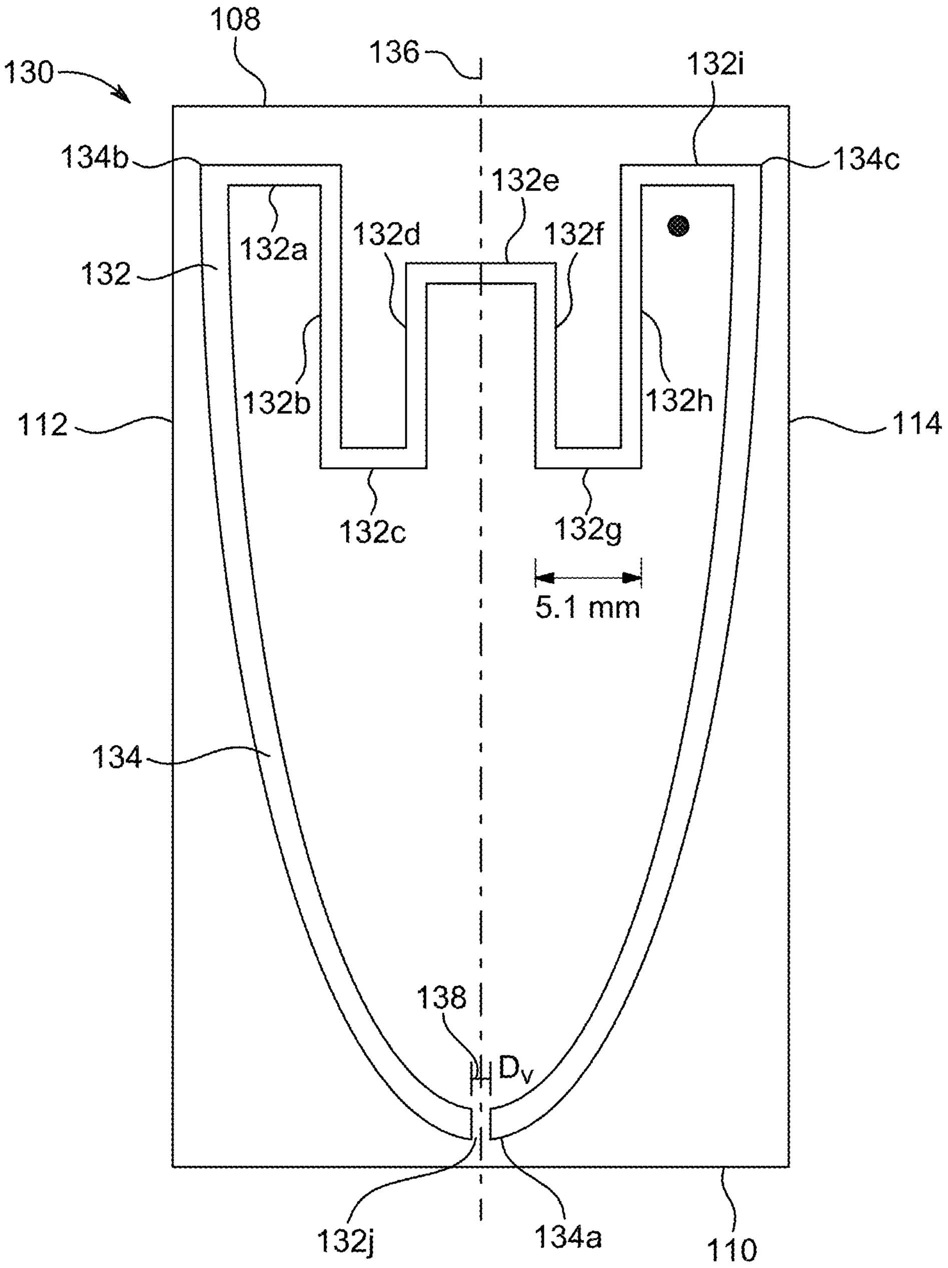
FIG. 1C is a structural view of a first narrow band antenna, according to certain embodiments.

FIG. 1C is a structural view of the first narrow band antenna 130, according to certain embodiments. The first narrow band antenna 130 is configured as a semi-elliptical slot-line loop 132 having an E-shaped base etched into the metallic layer 120. The semi-elliptical slot-line loop 132 of the first narrow band antenna 130 includes a semi-ellipse 134, and a plurality of connected legs (132*a*-132*i*). The semi-ellipse 134 is configured to have an apex 134*a*, a first end 134*b* and a second end 134*c*. In an example, the plurality of connected legs (132*a*-132*i*) includes nine legs having a first leg 132*a*, a second leg 132*b*, a third leg 132*c*, a fourth leg 132*d*, a fifth leg 132*e*, a sixth leg 132*f*, a seventh leg 132*g*, an eighth leg 132*h*, and a ninth leg 132*i*. The first leg 132*a* is connected to and perpendicular to the first end 134*b*. The second leg 132*b* is connected to and perpendicular to the first leg 132*a*. The second leg 132*b* has a length d1. The second leg 132*b* extends towards the second central axis 118. The third leg 132*c* is connected to and perpendicular to the second leg 132*b*. The third leg 132*c* is parallel to the first leg 132*a*. The third leg 132*c* extends towards the fourth edge 114. The fourth leg 132*d* is connected to and perpendicular to the third leg 132*c*. The fourth leg 132*d* has a length d2. The fourth leg 132*d* extends towards the first edge 108. In an aspect, the length d2 is less than length d1. The fifth leg 132*e* is connected to and perpendicular to the fourth leg 132*d*. The fifth leg 132*e* extends towards the third edge 112. The sixth leg 132*f* is connected to and perpendicular to the fifth leg 132*e*. The sixth leg 132*f* has a length d3. In an aspect, the length d3 is equal to the length d2. The sixth leg 132*f* extends towards the second central axis 118. The seventh leg 132*g* is connected to and perpendicular to the sixth leg 132*f*. The seventh leg 132*g* is parallel to the first leg 132*a* and extends towards the fourth edge 114. The eighth leg 132*h* is connected to and perpendicular to the seventh leg 132*g*. The eighth leg 132*h* has a length d4 and extends towards the first edge 108. In an example, the length d4 is equal to the length d1. The ninth leg 132*i* is connected to and perpendicular to the eighth leg 132*h* and extends towards the third edge 112. The ninth leg 132*i* is connected to the second end 134*c*. In an aspect, the width of the first narrowband antenna between the first end 134*b* and the second end 134*c* is about 24.7 mm.

As shown in FIG. 1C, the first narrow band antenna 130 is centered about a major axis 136. The major axis 136 bisects the apex 134*a* of the semi-ellipse 134 of the semi-elliptical slot-line loop 132 of the first narrow band antenna 130. The major axis 136 of the first narrow band antenna 130 is located between the third edge 112 and the first central axis 116 and is parallel to the first central axis 116. The gap 132*j* in the first narrow band antenna 130 is located at the apex 134*a* of the semi-ellipse 134. The apex 134*a* is located near the second central axis 118. The first varactor diode 138 is connected across the gap 132*j* to the metallic layer 120 enclosed by the semi-elliptical slot-line loop 132 of the first narrow band antenna 130. An area enclosed by the semi-elliptical slot-line loop of the first narrow band antenna 130 is also known as a second biased area. The first varactor diode 138 is further connected to the metallic layer 120 (to a ground plane) outside of the semi-elliptical slot-line loop 132 of the first narrow band antenna 130. A second adjustable bias voltage source 140 located on the bottom side 106 is operatively connected to the first varactor diode 138.

The second biased area is connected by a second shorting post 139 to the second adjustable bias voltage source 140. In an aspect, a second adjustable bias voltage circuit is formed by the second shorting post 139 and the second adjustable bias voltage source 140. The second adjustable bias voltage circuit includes a second resistor R2 in series with a second inductor $L_2$. In an example, the second adjustable bias voltage source 140 is operatively connected to the first varactor diode 138 through the second shorting post 139. The second shorting post 139 extends from the top side 104 to the metallic layer 120 enclosed by the second biased area.

Referring to FIG. 1A-FIG. 1B, the second narrow band antenna 142 is located between the first edge 108 and the second central axis 118 and between the first central axis 116 and the fourth edge 114.

Figure 1D:
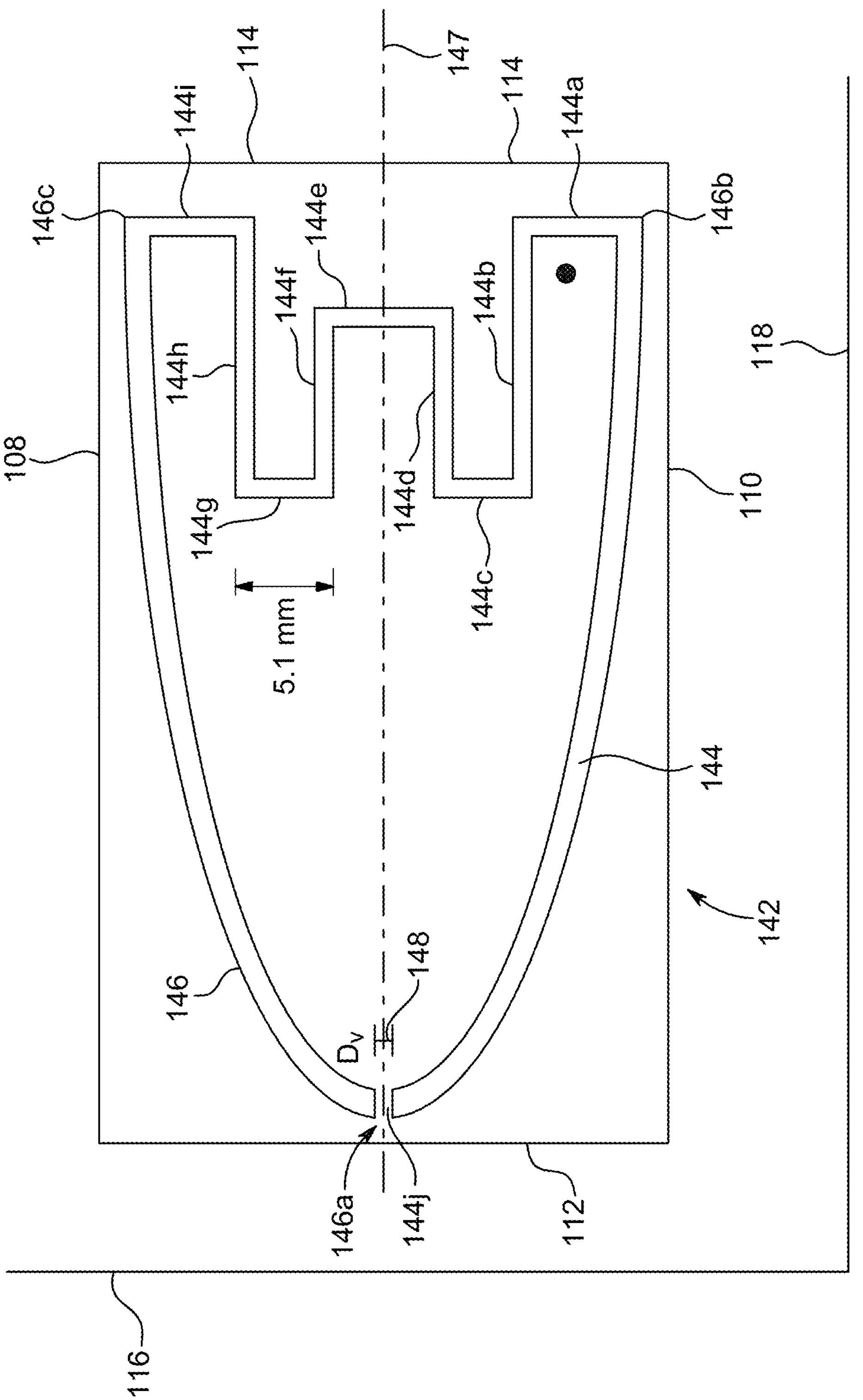
FIG. 1D is a structural view of a second narrow band antenna, according to certain embodiments.
Figure 1E:
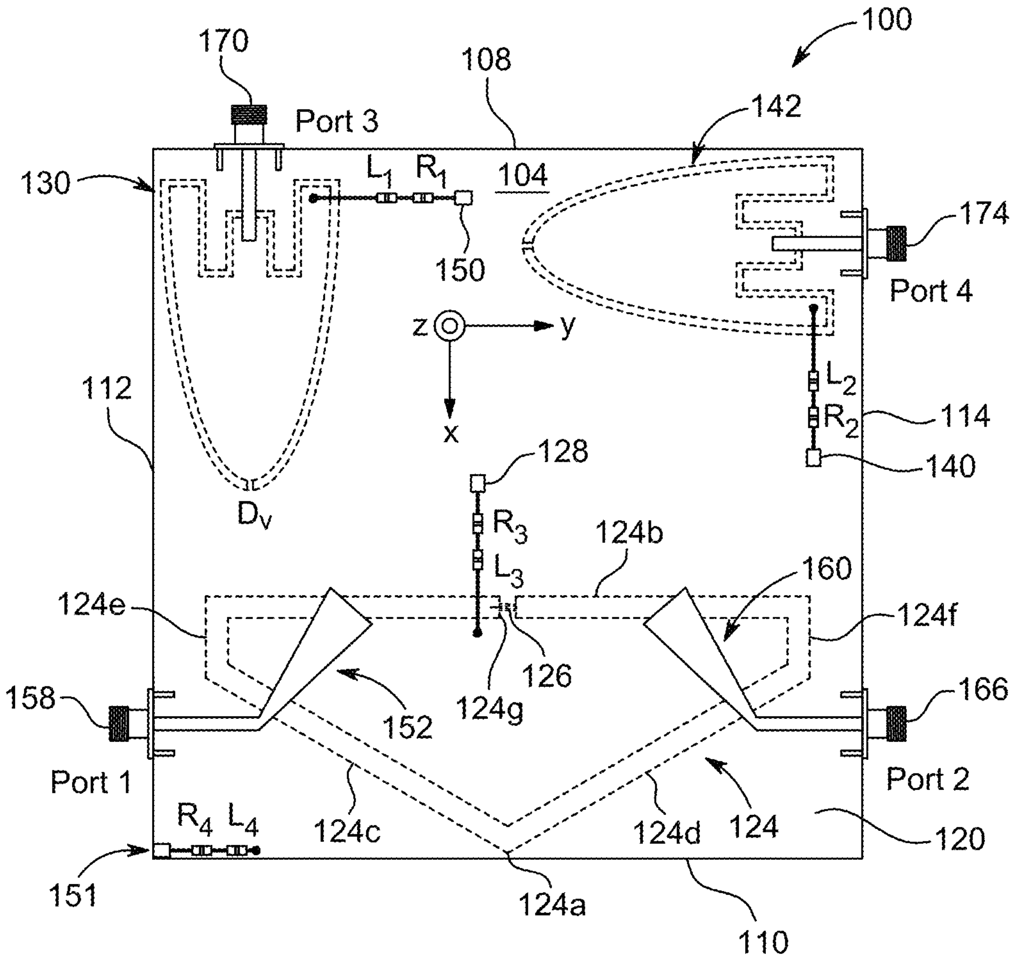
FIG. 1E is a top view of a fabricated three element slot-based antenna, according to certain embodiments.

FIG. 1D is a structural view of a second narrow band antenna 142, according to certain embodiments. The semi-elliptical slot-line loop 144 having an E-shaped base of the second narrow band antenna 142 includes a semi-ellipse 146, and a plurality of connected legs (144*a*-144*i*). The semi-ellipse 146 is configured to have an apex 146*a*, a first end 146*b* and a second end 146*c*. For example, the plurality of connected legs (144*a*-144*i*) includes nine legs having a first leg 144*a*, a second leg 144*b*, a third leg 144*c*, a fourth leg 144*d*, a fifth leg 144*e*, a sixth leg 144*f*, a seventh leg 144*g*, an eighth leg 144*h*, and a ninth leg 144*i*. The first leg 144*a* is connected to and perpendicular to the first end 146*b*. The second leg 144*b* is connected to and perpendicular to the first leg 144*a*. The second leg 144*b* has a length d1 and extends towards the first central axis 116. The third leg 144*c* is connected to and perpendicular to the second leg 144*b*. The third leg 144*c* is parallel to the first leg 144*a* and extends towards the first edge 108. The fourth leg 144*d* is connected to and perpendicular to the third leg 144*c*. The fourth leg 144*d* has a length d2 and extends towards the fourth edge 114. In an example, the length d2 is less than the length d1. The fifth leg 144*e* is connected to and perpendicular to the fourth leg 144*d*. The fifth leg 144*e* extends towards the first edge 108. The sixth leg 144*f* is connected to and perpendicular to the fifth leg 144*e*. The sixth leg 144*f* has a length d3. In an example, the length d3 is equal to the length d2. The sixth leg 144*f* extends towards the first central axis 116. The seventh leg 144*g* is connected to and perpendicular to the sixth leg 144*f*. The seventh leg 144*g* is parallel to the first leg 144*a* and extends towards the first edge 108. The eighth leg 144*h* is connected to and perpendicular to the seventh leg 144*g*. The eighth leg 144*h* has a length d4 and extends towards the fourth edge 114. In an example, the length d4 is equal to the length d1. The ninth leg 144*i* is connected to and perpendicular to the eighth leg 144*h* and extends towards the first edge 108. The ninth leg 144*i* is connected to the second end 146*c*. In an aspect, the width of the second narrowband antenna between the first end 146*b* and the second end 146*c* is about 24.7 mm.

As shown in FIG. 1D, the second narrow band antenna 142 is centered about a major axis 147 which bisects the apex 146*a* of the semi-ellipse 146 of the semi-elliptical slot-line loop 144 of the second narrow band antenna 142. The major axis 147 of the second narrow band antenna 142 is located between the first edge 108 and the second central axis 118 and is parallel to the second central axis 118. The gap 144*j* in the second narrow band antenna 142 is located at the apex 146*a* of the semi-ellipse 146. The apex 146*a* is located near the first central axis 116. The second varactor diode 148 is connected across the gap 144*j* to the metallic layer 120 enclosed by the semi-elliptical slot-line loop of the second narrow band antenna 142 (an area enclosed by the semi-elliptical slot-line loop of the second narrow band antenna 142 is also known as a third biased area). The third biased area is connected by a third shorting post 149 to a third adjustable bias voltage source 150 located on the bottom side 106. In an aspect, a third adjustable bias voltage circuit is formed by the third shorting post 149 and the third adjustable bias voltage source 150. The third adjustable bias voltage circuit includes a third resistor R3 that is in series with a third inductor $L_3$. The second varactor diode 148 is further connected to the metallic layer 120 (to a ground plane) outside of the semi-elliptical slot-line loop of the second narrow band antenna 142. In an example, the third adjustable bias voltage source 150 is operatively connected to the second varactor diode 148 through the third shorting post 149. The third shorting post 149 extends from the top side to the metallic layer enclosed by the third biased area.

The first adjustable bias voltage source 128, the second adjustable bias voltage source 140 and the third adjustable bias voltage source 150 are independently adjustable so as to tune the frequency response of each antenna.

In an aspect, the apex 146*a* of the second narrow band antenna is located at a distance of about 26.2 mm from the intersection of legs 134*c* and 134*a* of the first narrow band antenna 130. In an aspect, the first end 146*b* of the semi-ellipse 146 is located at a distance of about 37.4 mm from the base 124*b* of the sensing antenna.

Figure 1F:
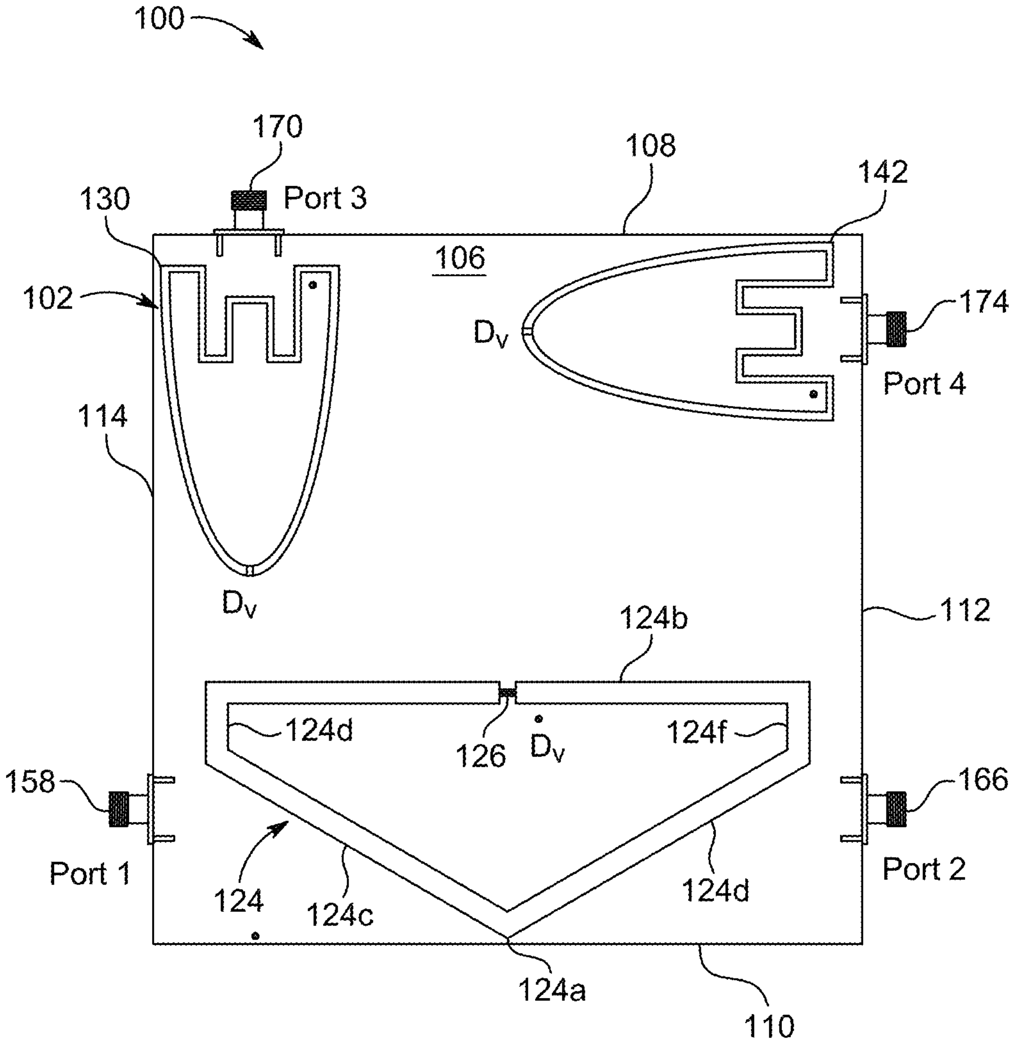
FIG. 1F is a bottom view of the fabricated three element slot-based antenna, according to certain embodiments.

FIG. 1E is a top view of a fabricated antenna. FIG. 1F is a bottom view of the fabricated antenna. In an example, the antenna 100 was fabricated using a laser milling machine (for example, the LPKF S104, manufactured by LPKF Laser & Electronics, located at Osteriede 7, 30827 Garbsen, Germany). The fabricated three element slot-based antenna has four ports. During experiments, the fabricated antenna has been measured in terms of S-parameters and radiation characteristics.

As shown in FIG. 1E and FIG. 1A, the first tapered transmission line 152 is located on the top side 104 above the sensing antenna and between the third edge 112 and the first central axis 116. The first tapered transmission line 152 includes a first end 152*a* and a second end 152*b*. The first end 152*a* of the first tapered transmission line 152 is connected to a first feed port 158 (also known as port 1). The second end 152*b* of the first tapered transmission line 152 is oriented towards the base 124*b* of the semi-hexagonal shaped slot antenna 122. The first tapered transmission line 152 has a transmission line segment 154 and a tapered segment 156. The transmission line segment 152 extends from the third edge 112 to first leg 124*c* of the semi-hexagonal slot-line loop 124. The transmission line segment 154 has a first end and a second end. The first end of the transmission line segment 154 is configured to connect to the first feed port 158 and has a width w1. The tapered segment 156 has a first end and a second end. The first end is connected to the second end of the transmission line segment. The first end of the tapered segment 156 has a width w2. For example, the width w2 equals to the width w1. The second end has a width w3. In an example, the width w3 is about four times the width w2. The tapered segment 156 makes an angle in the range of about 100 degrees to about 130 degrees with respect to the transmission line segment 154.

The second tapered transmission line 160 is located on the top side 104 above the sensing antenna and between the fourth edge 114 and the first central axis 116. The second tapered transmission line 160 includes a first end 160*a* and a second end 160*b*. The first end 160*a* of the second tapered transmission line 160 is connected to a second feed port 166 (also known as port 2). The second end 160*b* of the second tapered transmission line 160 is oriented towards the base of the semi-hexagonal shaped slot antenna 122. The second tapered transmission line 160 includes a transmission line segment 162, and a tapered segment 164. The transmission line segment 162 has a first end and a second end. The transmission line segment 162 extends from the fourth edge 114 to the second leg 124*d* of the semi-hexagonal slot-line loop 124. The first end of the transmission line segment is configured to connect to the second feed port 166 and has a width w1. The tapered segment 164 has a first end and a second end. The first end of the tapered segment 164 is connected to the second end of the transmission line segment 162. The first end tapered segment 164 has a width w2. For example, the width w2 equals to the width w1. The second end has a width w3. In an example, the width w3 is about four times the width w2. The tapered segment 162 makes an angle in the range of about minus 100 degrees to about minus 130 degrees with respect to the transmission line segment 164.

The first microstrip transmission line 168 is located on the top side 104 and extending from the first edge 108 and above the E-shaped base of the first narrow band antenna 130. The first microstrip transmission line 168 is connected to a third feed port 170 (also known as port 3).

The second microstrip transmission line 172 is located on the top side 104 and extending from the fourth edge 114 and above the E-shaped base of the second narrow band antenna. The second microstrip transmission line 172 is connected to a fourth feed port 174 (also known as port 4).

The antenna 100 is configured to resonate with circular polarization (CP) in an ultra-high frequency sub-GHz range of about 570 MHz to about 950 MHz when an input signal is applied to each feed port.

In an aspect, the semi-hexagonal shaped slot antenna 122 is configured to transmit ultra-high frequency signals with left hand circular polarization (LHCP) in a bandwidth ranging from 0.57 GHz to 0.95 GHz when the input signal is connected to the first feed port 158. In another aspect, the semi-hexagonal shaped slot antenna is configured to transmit ultra-high frequency signals with right hand circular polarization (RHCP) in a bandwidth ranging from 0.57 GHz to 0.95 GHz when the input signal is connected to the second feed port 166.

In an aspect, the sensing antenna is configured to be tuned by adjusting the first adjustable bias voltage on the capacitor, causing the sensing antenna to achieve circular polarization in a bandwidth ranging from 0.57 GHz to 0.95 GHz.

In an aspect, the first narrow band antenna 130 is configured to be tuned by adjusting the second adjustable bias voltage on the first varactor diode to achieve left hand elliptical polarization (LHEP) in the bandwidth ranging from 0.57 GHz to 0.95 GHz.

In an aspect, the second narrow band antenna is configured to be tuned by adjusting the third adjustable bias voltage on the second varactor diode 148 to achieve right hand elliptical polarization (RHEP) in the bandwidth ranging from 0.57 GHz to 0.95 GHz.

The following examples are provided to illustrate further and to facilitate the understanding of the present disclosure.

During experimentation, the antenna 100 was stimulated using HFSS (High Frequency Structure Simulator). The fabricated antenna 100 was characterized for S-parameters using vector network analyzer (for example, Agilent Field-Fox RF Vector Network Analyzer manufactured by Agilent Technologies, Inc., located at 5301 Stevens Creek Blvd. Santa Clara, CA, United States of America).

The fabricated antenna 100 was developed, evaluated and analyzed using an Ansys Electromagnetics Suite. The Ansys Electromagnetics Suite (part of Ansys Electronics Desktop (AEDT) developed by Ansys, Inc., Southpointe 2600 Ansys Drive Canonsburg, PA 15317 USA) is a platform that enables electronic system design. AEDT provides access to the industry gold-standard Ansys simulators for work with antenna, RF, microwave, PCB, integrated circuit (IC) and IC package designs, along with electromechanical devices such as electric motors and generators. The frequency band of the antenna 100 may be controlled to shift further towards lower frequencies or towards higher frequencies by adjusting only the capacitance value of the varactor diode (varactor diode is a type of diode whose internal capacitance varies with respect to the reverse voltage).

The present disclosure discloses an antenna system that includes three antennas: a wideband antenna (sensing antenna) that feeds from two feedlines to provide circular polarization, and two narrowband (NB) antennas that feed from separate feedlines in a different orientation to achieve radiation diversity. Similar to the sensing antenna, each of the NB antenna (the first narrow band antenna 130 and the second narrow band antenna 142) is loaded with a reactive loading to reduce the resonant frequency. A varactor diode is connected to the NB antenna to reconfigure its operating frequency based on the bias voltage value, which changes the capacitor value of the varactor diode. By changing the value of the loading on the capacitor of the varactor diode, the antenna is configured to achieve frequency reconfigurability. Each of the NB antennas (the first narrow band antenna 130 and the second narrow band antenna 142) change its frequency over the operating band of the wide-band antenna (WB antenna). The antenna system integrates a dual sense circularly polarized wide-band antenna (sensing antenna) for sensing and two reconfigurable narrowband antennas for communication purposes.

The two NB antennas (the first narrow band antenna 130 and the second narrow band antenna 142) are printed in two different directions to achieve pattern diversity. During experiments, five capacitance values (0.84 μF, 0.9 μF, 1.24 μF, 2.09 μF, 3.28 μF, and 5.08 μF) are used to tune the resonant frequency of the antenna over the wide frequency band.

First Experiment: simulating S-parameters of the sensing antenna with a capacitive loading and without the capacitive loading.

During the first experiment, the sensing antenna was simulated with a capacitor and without the capacitor and corresponding results were analyzed.

Figure 2:
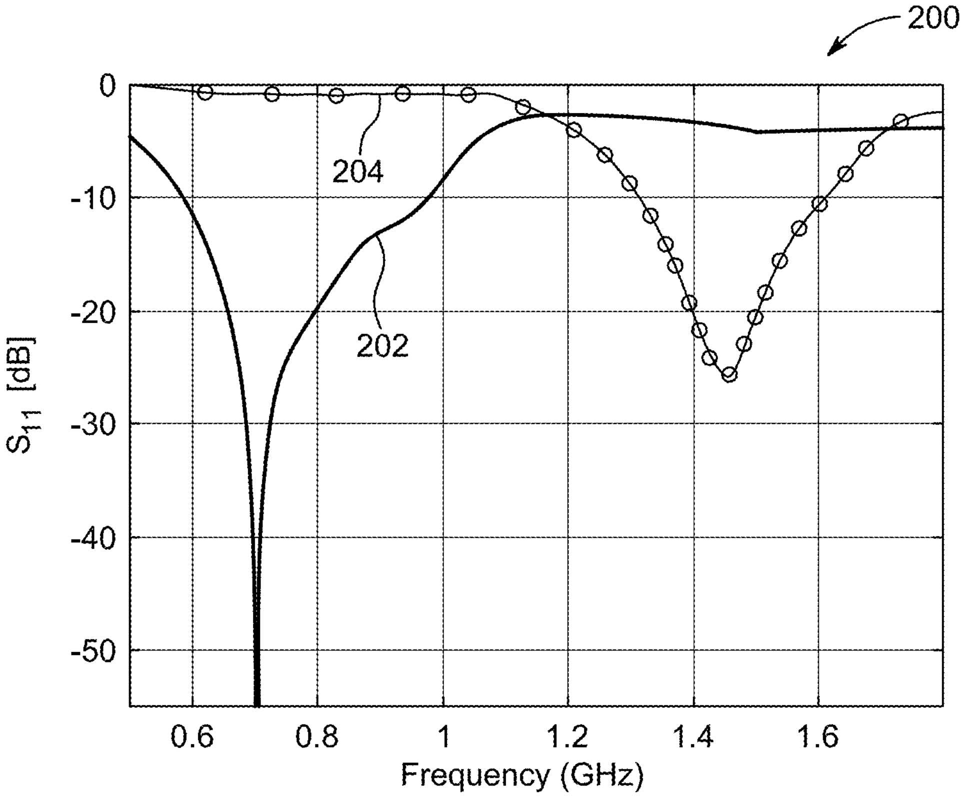
FIG. 2 is a graph of simulated S-parameters of a sensing antenna with and without capacitor load, according to certain embodiments.

FIG. 2 is a graph 200 of simulated S-parameters ($S_{11}$) of the sensing antenna with the capacitive loading and without the capacitive loading. Signal 202 represents the simulated values of $S_{11}$ with capacitor. Signal 204 represents the simulated values of $S_{11}$ without the capacitor.

In an aspect, the sensing antenna has a perimeter of 0.85 $\lambda_g$ at the center of the required band (0.7 GHZ), loaded with a capacitor having a value of 0.38 μF, resulting small length of the semi-hexagonal slot-line loop and improving the impedance bandwidth. In an example, a width of the semi-hexagonal slot-line loop is 3 mm. In an aspect, the sensing antenna operates in a frequency band from 1.3 GHZ to 1.62 GHz before loading the capacitor, while the frequency band is reduced to cover a band from 0.57 GHz to 0.95 GHz after loading the capacitor.

Figure 3:
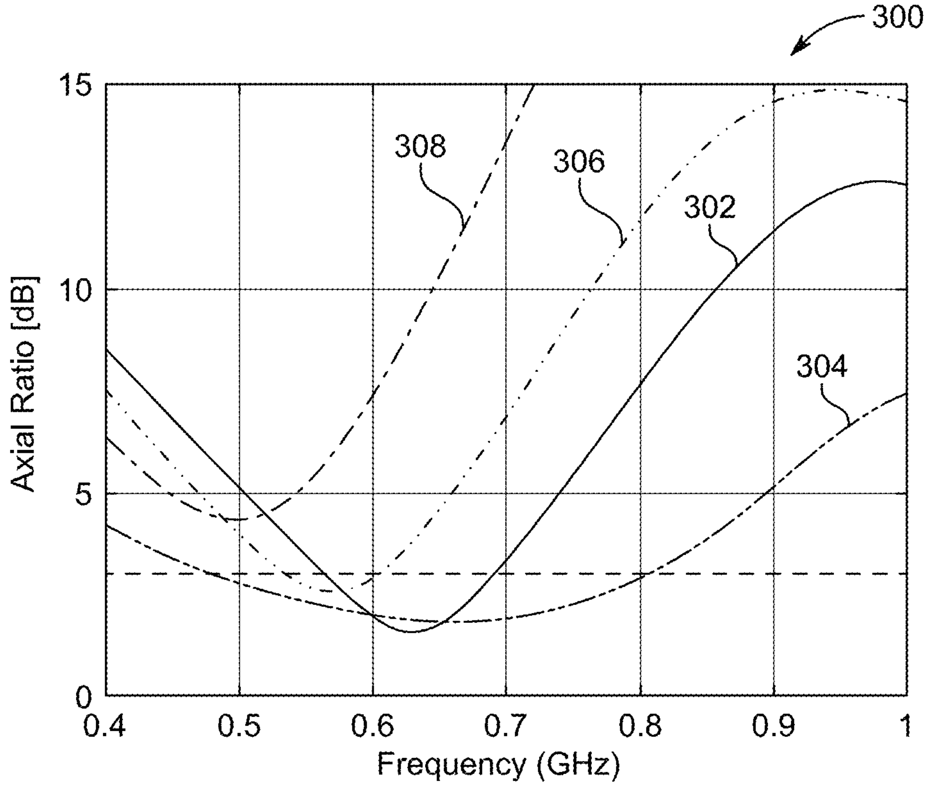
FIG. 3 is a graph of simulated axial ratio (AR) of the three element slot-based antenna at different capacitor values, according to certain embodiments.

FIG. 3 is a graph 300 of simulated axial ratio (AR) of the sensing antenna at different capacitor values. The semi-hexagonal slot-line loop 124 feeds by two tapered transmission lines (first tapered transmission line and the second tapered transmission line). The first feed port (P-1) excites LHCP, and the second feed port (P-2) excites RHCP. The AR of the sensing antenna has been presented versus frequency at different capacitor values in FIG. 3. Signal 302 represents AR of the sensing antenna when the capacitor value is 0.31 μF. Signal 304 represents AR of the sensing antenna when the capacitor value is 0.38 μF. Signal 306 represents AR of the sensing antenna when the capacitor value is 0.66 μF. Signal 308 represents AR of the sensing antenna when the capacitor value is 1.08 μF. As shown in FIG. 3, the AR with the capacitor value of 0.38 pF confirm the CP of the antenna 100.

Figure 4:
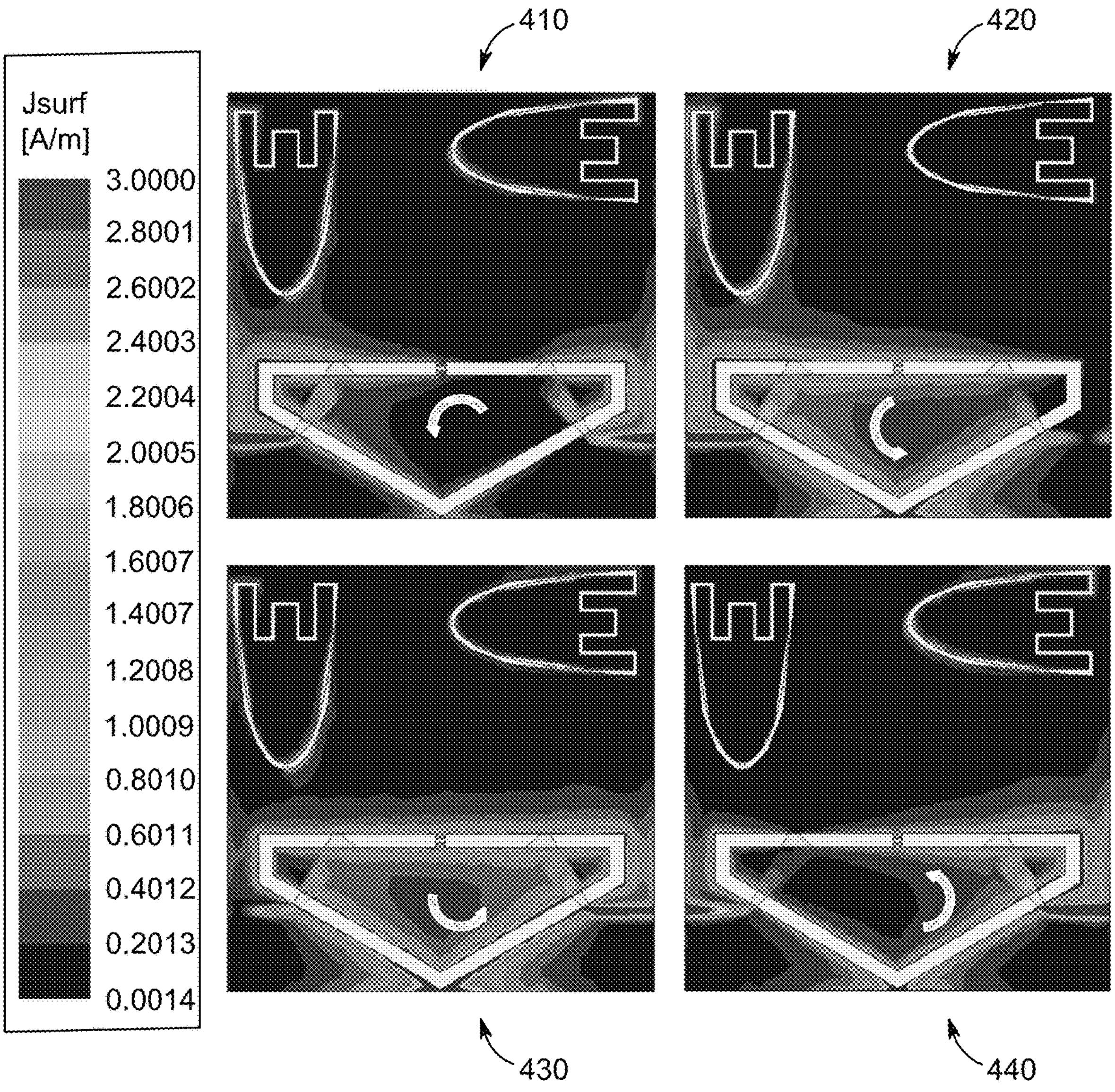
FIG. 4 is a representation of current distribution for various phases when a first feed port of the sensing antenna is excited, according to certain embodiments.

To better understand the CP generation in the LHCP sense and the RHCP sense, the surface current distributions are illustrated in FIG. 4. When the first feed port (port 1) is excited, the current distributions are plotted at angles of 0°, 45°, 90°, and 135° at 0.65 GHz using a High Frequency Structured Simulator (HFSS) as depicted in FIG. 4.

FIG. 4 represents a current density distribution for various phases when the first feed port 158 (port 1) of the sensing antenna is excited. 410 represents the current density distribution for 0°, when the first feed port 158 is excited. 420 represents the current density distribution for 45°, when the port 1 is excited. 430 represents the current density distribution for 90°, when the port 1 is excited. 440 represents the current density distribution for 135°, when the port 1 is excited. Current density distribution is a useful tool for analyzing antennas as it allows the visualization the current distribution along the wires (or other conductors). Current distribution gives a first-order indication of the resulting polarization and general pattern of the antenna. The directions of the arrows show the current intensity variation, resulting in left-handed circular polarized antenna. The current density distribution along the antenna determines the radiation pattern. When net current flow is mostly in one direction, that direction represents an antenna polarization.

It was observed that the current distribution varies in an anti-clockwise direction that led to the generation of left-handed circular polarization. Similarly, when the antenna is excited from the second feed port (port 2), the current directions vary in a clockwise direction, demonstrating the antenna's ability to radiate as right-handed circular polarization. These findings provide insights into the CP generation mechanism of the antenna and may aid in the development of more efficient and effective CP antennas.

Figure 5A:
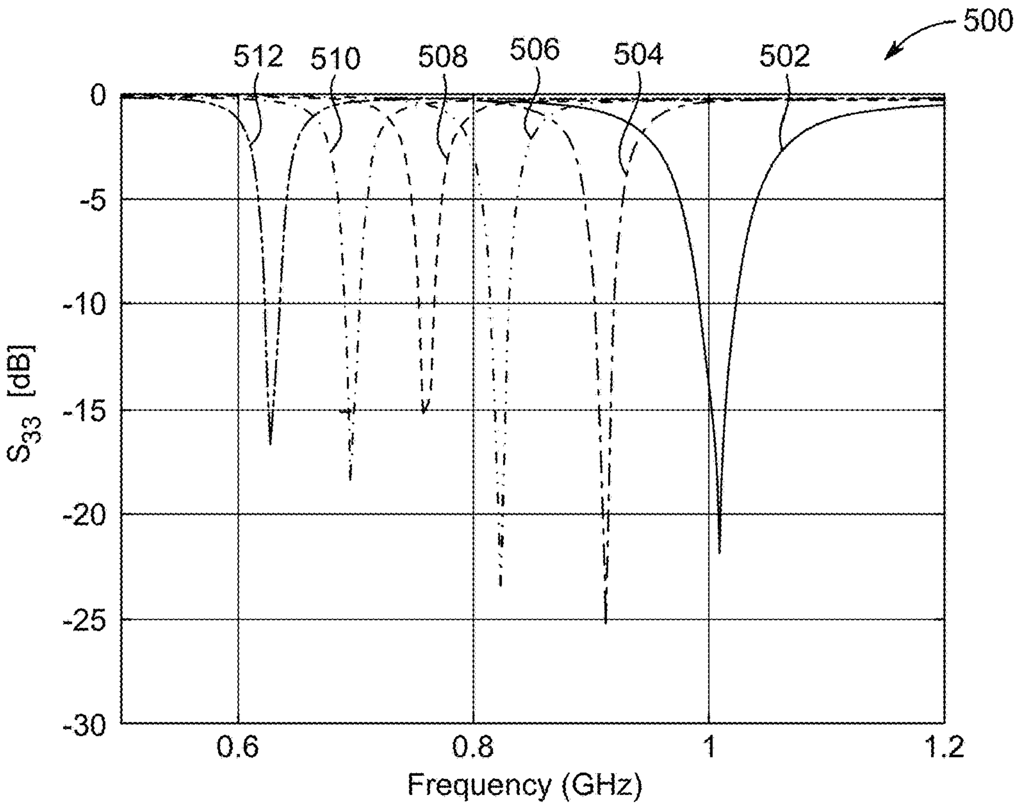
FIG. 5A is a graph of simulated reflection coefficient ($S_{33}$) curves at different capacitor values, according to certain embodiments.

FIG. 5A is a graph 500 of simulated reflection coefficient ($S_{33}$) curves at different capacitor values for the first narrow band antenna 130. The S-parameters describe the input-output relationship between ports (or terminals) in an electrical system. For example, if there are 2 ports (port-1 and port-2), then $S_{12}$ represents the power transferred from port-2 to port-1. $S_{21}$ represents the power transferred from port-1 to port-2. Signal 502 represents the simulated values of reflection coefficient ($S_{33}$) when the capacitor value is 0.84 µF. Signal 504 represents the simulated values of reflection coefficient ($S_{33}$) when the capacitor value is 0.90 µF. Signal 506 represents the simulated values of reflection coefficient ($S_{33}$) when the capacitor value is 1.24 µF. Signal 508 represents the simulated values of reflection coefficient ($S_{33}$) when the capacitor value is 2.09 µF. Signal 510 represents the simulated values of reflection coefficient ($S_{33}$) when the capacitor value is 3.28 µF. Signal 512 represents the simulated values of reflection coefficient ($S_{33}$) when the capacitor value is 5.08 µF.

Figure 5B:
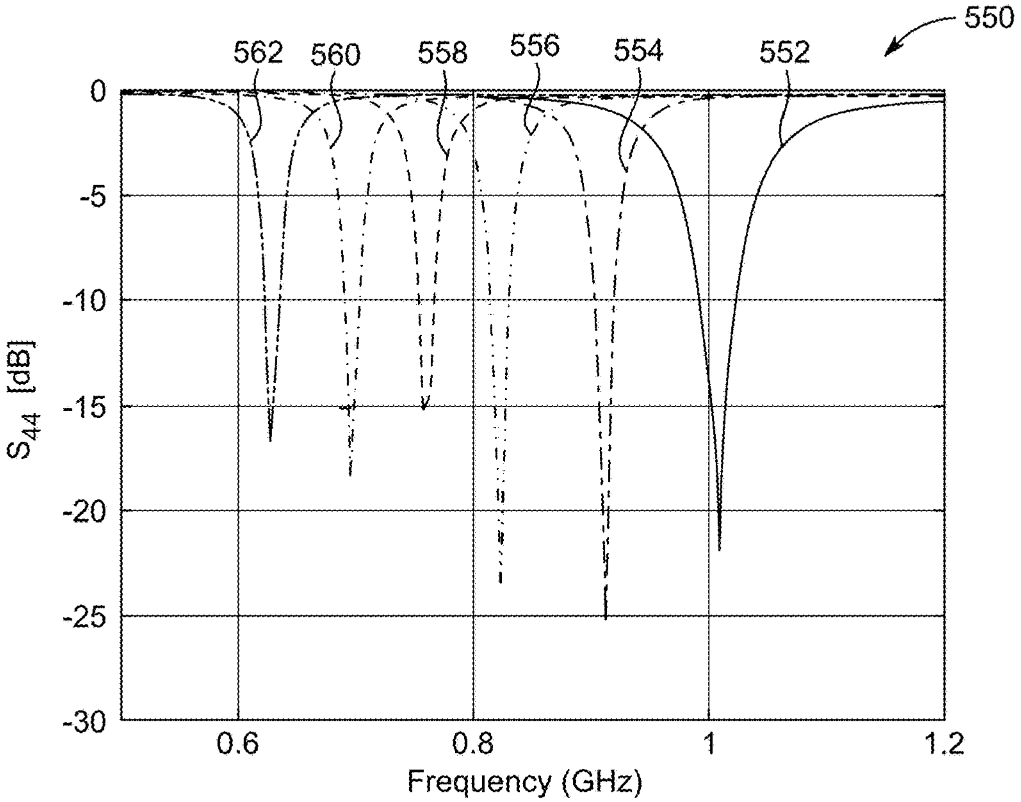
FIG. 5B is a graph of simulated reflection coefficient ($S_{44}$) curves at different capacitor values, according to certain embodiments.

FIG. 5B is a graph 550 of simulated reflection coefficient ($S_{44}$) curves at different capacitor values for the second narrow band antenna. Signal 552 represents the simulated values of reflection coefficient ($S_{44}$) when the capacitor value is 0.84 µF. Signal 554 represents the simulated values of reflection coefficient ($S_{44}$) when the capacitor value is 0.90 µF. Signal 556 represents the simulated values of reflection coefficient ($S_{44}$) when the capacitor value is 1.24 µF. Signal 558 represents the simulated values of reflection coefficient ($S_{44}$) when the capacitor value is 2.09 µF. Signal 560 represents the simulated values of reflection coefficient ($S_{44}$) when the capacitor value is 3.28 µF. Signal 562 represents the simulated values of reflection coefficient ($S_{44}$) when the capacitor value is 5.08 µF.

As depicted from FIG. 5A-FIG. 5B, graphs show a good matching in all cases, and the resonant frequency decreases with increasing the capacitance value.

Figure 6A:
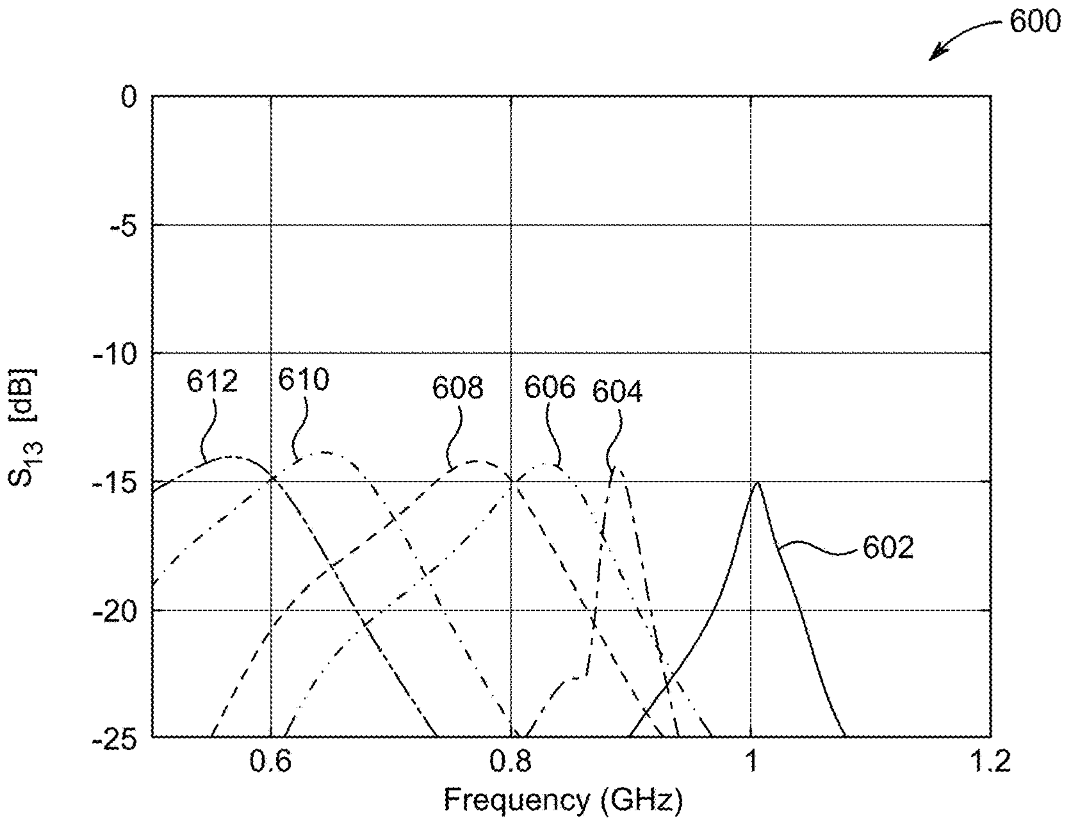
FIG. 6A is a graph of simulated isolation coefficient ($S_{13}$) curves when the first feed port of the sensing antenna and a third feed port of the first narrow band antenna are excited, according to certain embodiments.

FIG. 6A is a graph 600 of simulated isolation coefficient ($S_{13}$) curves when the port 1 of the sensing antenna and the first microstrip transmission line 168 (port 3) of the first narrow band antenna 130 are excited. Signal 602 represents $S_{13}$ when the capacitor value is 0.84 µF. Signal 604 represents $S_{13}$ when the capacitor value is 0.90 µF. Signal 606 represents $S_{13}$ when the capacitor value is 1.24 µF. Signal 608 represents $S_{13}$ when the capacitor value is 2.09 µF. Signal 610 represents $S_{13}$ when the capacitor value is 3.28 µF. Signal 612 represents of $S_{13}$ when the capacitor value is 5.08 µF.

Figure 6B:
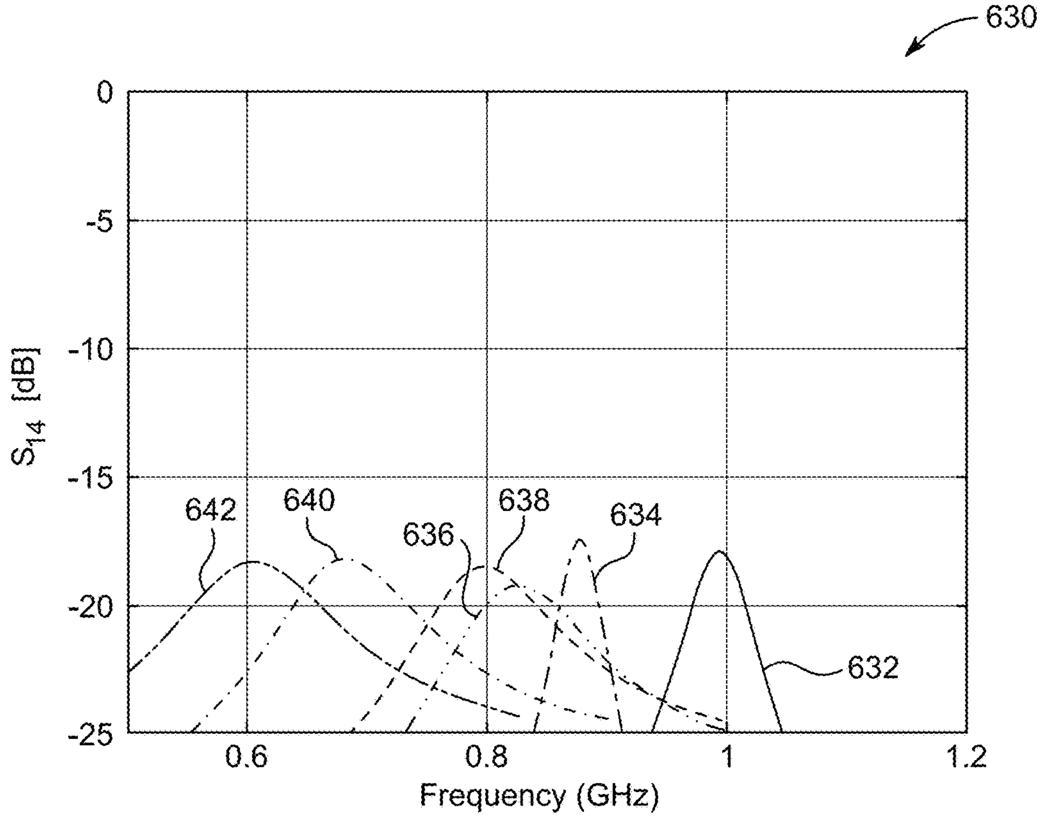
FIG. 6B is a graph of simulated isolation coefficient ($S_{14}$) curves when the first feed port of the sensing antenna and a fourth feed port of the second narrow band antenna are excited, according to certain embodiments.

FIG. 6B is a graph 630 of simulated isolation coefficient ($S_{14}$) curves when the port 1 of the sensing antenna and the second microstrip transmission line 172 (a port 4) of the second narrow band antenna 142 are excited. Signal 632 represents $S_{14}$ when the capacitor value is 0.84 pF. Signal 634 represents $S_{14}$ when the capacitor value is 0.90 µF. Signal 636 represents $S_{14}$ when the capacitor value is 1.24 µF. Signal 638 represents $S_{14}$ when the capacitor value is 2.09 pF. Signal 640 represents $S_{14}$ when the capacitor value is 3.28 µF. Signal 642 represents $S_{14}$ when the capacitor value is 5.08 µF.

Figure 6C:
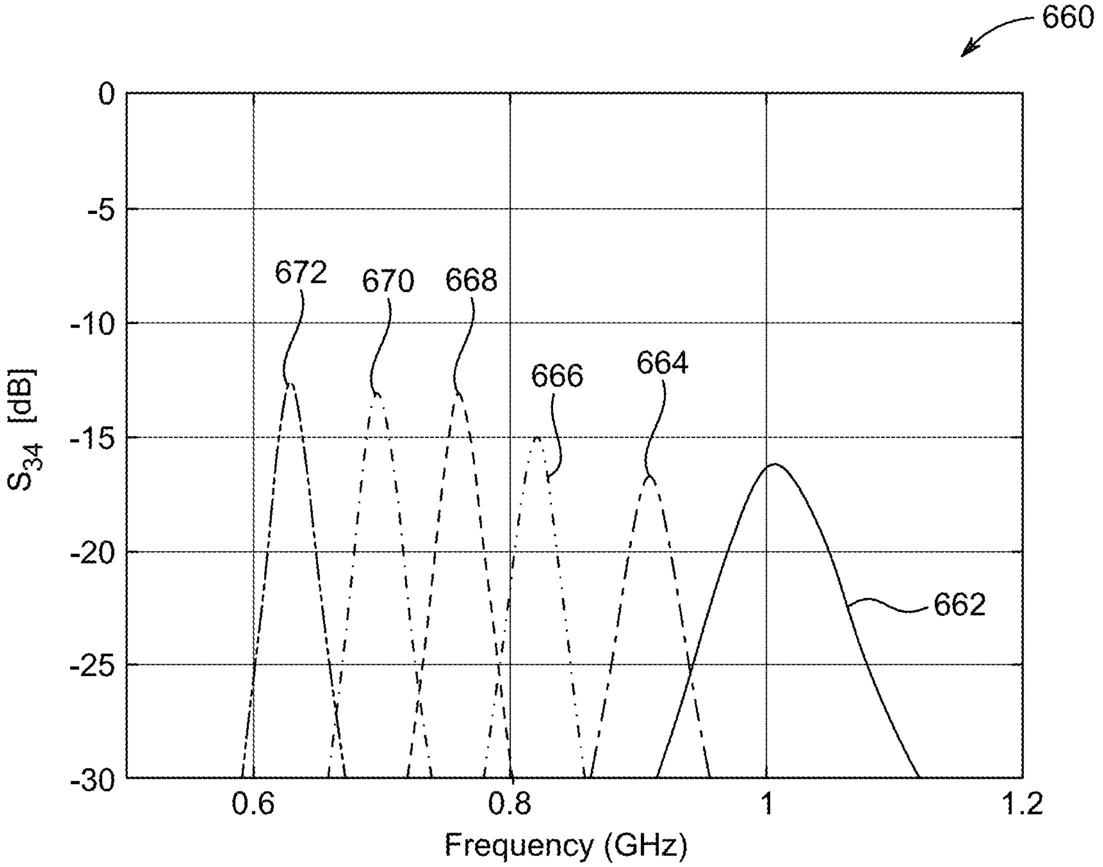
FIG. 6C is a graph of simulated isolation coefficient ($S_{34}$) curves when a third feed port of the first narrow band antenna and the fourth feed port of the second narrow band antenna are excited, according to certain embodiments.

FIG. 6C is a graph 660 of simulated isolation coefficient ($S_{34}$) curves when the port 3 of the first narrow band antenna 130 and the port 4 of the second narrow band antenna 142 are excited. Signal 662 represents $S_{34}$ when the capacitor value is 0.84 µF. Signal 664 represents $S_{34}$ when the capacitor value is 0.90 µF. Signal 666 represents $S_{34}$ when the capacitor value is 1.24 pF. Signal 668 represents $S_{34}$ when the capacitor value is 2.09 µF. Signal 670 represents $S_{34}$ when the capacitor value is 3.28 µF. Signal 672 represents $S_{34}$ when the capacitor value is 5.08 pF.

The antenna is configured to provide high isolations between the first narrow band antenna 130 and the second narrow band antenna 142, the first narrow band antenna 130 and the sensing antenna, and second narrow band antenna 142 and the sensing antenna due to different orientations of the antennas as shown in FIG. 1E.

Figure 7A:
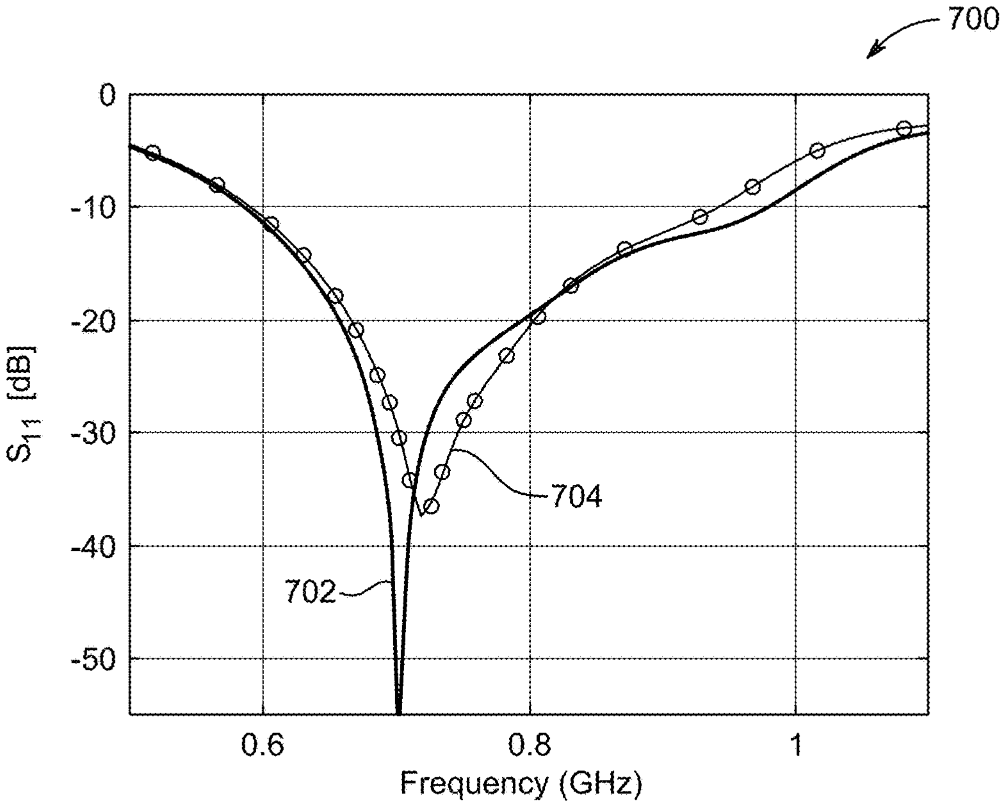
FIG. 7A is a graph of simulated and measured reflection coefficient ($S_{11}$) curves when the first feed port of the sensing antenna is excited, according to certain embodiments.

FIG. 7A is a graph 700 of simulated and measured reflection coefficient ($S_{11}$) curves when the port 1 of the sensing antenna is excited. Signal 702 represents the simulated values of $S_{11}$. Signal 704 represents the measured values of $S_{11}$.

Figure 7B:
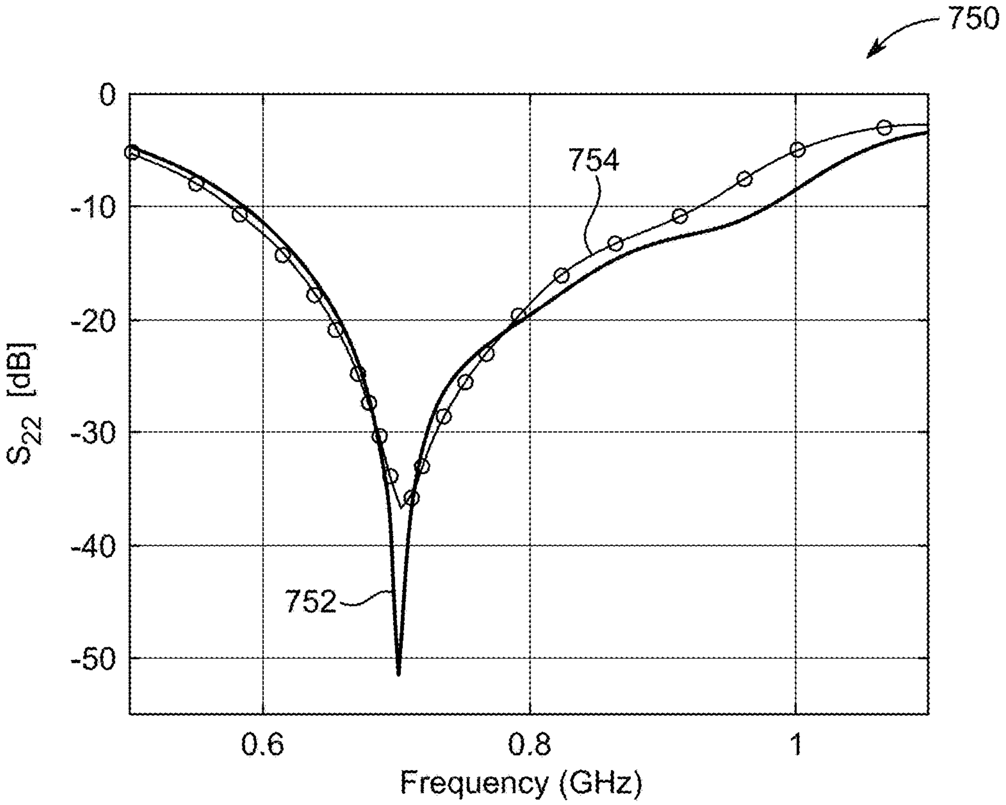
FIG. 7B is a graph of simulated and measured reflection coefficient ($S_{22}$) curves when a second feed port of the sensing antenna is excited, according to certain embodiments.

FIG. 7B is a graph 750 of simulated and measured reflection coefficient ($S_{22}$) curves when the port 2 of the sensing antenna is excited. Signal 752 represents the simulated values of $S_{22}$. Signal 754 represents the measured values of $S_{22}$.

FIG. 7A-FIG. 7B show a good agreement between the simulated and measured reflection coefficients of the WB antenna (sensing antenna), the results confirm that the antenna operates from 0.59 to 0.95 GHz numerically and experimentally with a good matching over the wide band.

Figure 8A:
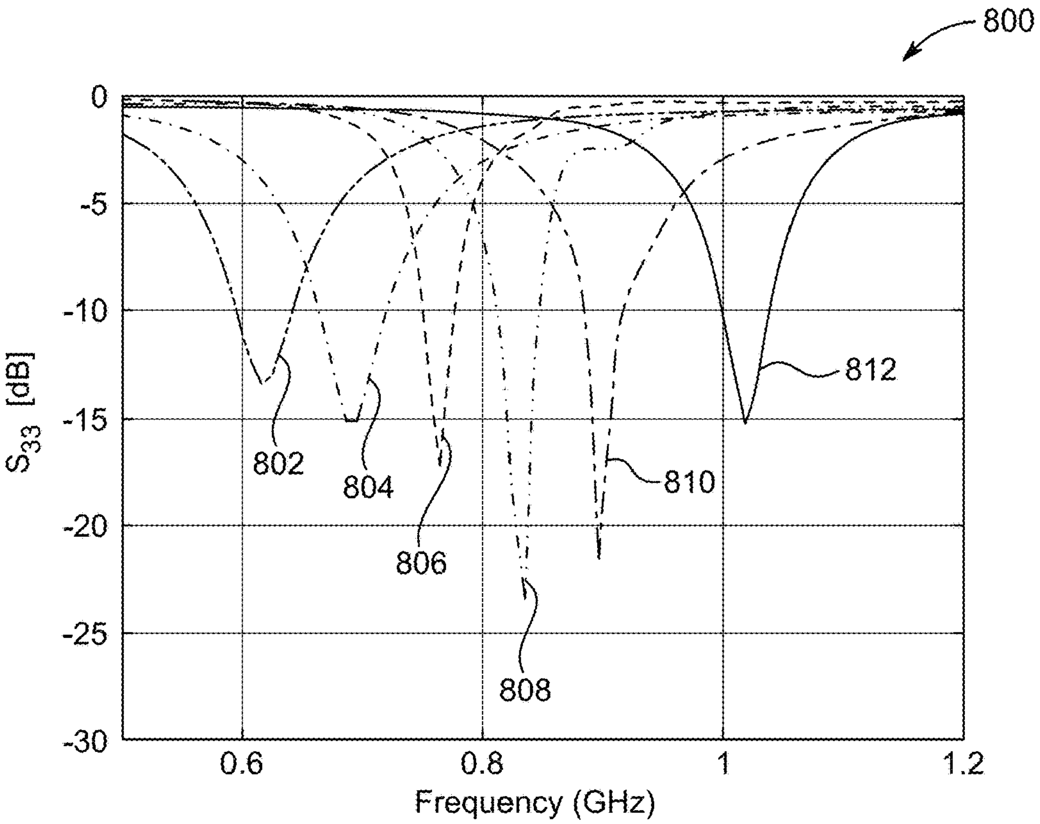
FIG. 8A is a graph of measured reflection coefficient ($S_{33}$) curves when the third feed port of the first narrow band antenna is excited, according to certain embodiments.

FIG. 8A is a graph 800 of measured reflection coefficient ($S_{33}$) curves when the port 3 of the first narrow band antenna 130 is excited with varying voltage. Signal 802 represents the measured values of $S_{33}$ when an applied voltage is 0 V. Signal 804 represents the measured values of $S_{33}$ when the applied voltage is 1 V. Signal 806 represents the measured values of $S_{33}$ when the applied voltage at the port 3 is 2.5 V. Signal 808 represents the measured values of $S_{33}$ when the applied voltage is 5 V. Signal 810 represents the measured values of $S_{33}$ when applied voltage is 10 V. Signal 812 represents the measured values of $S_{33}$ when applied voltage is 15 V.

Figure 8B:
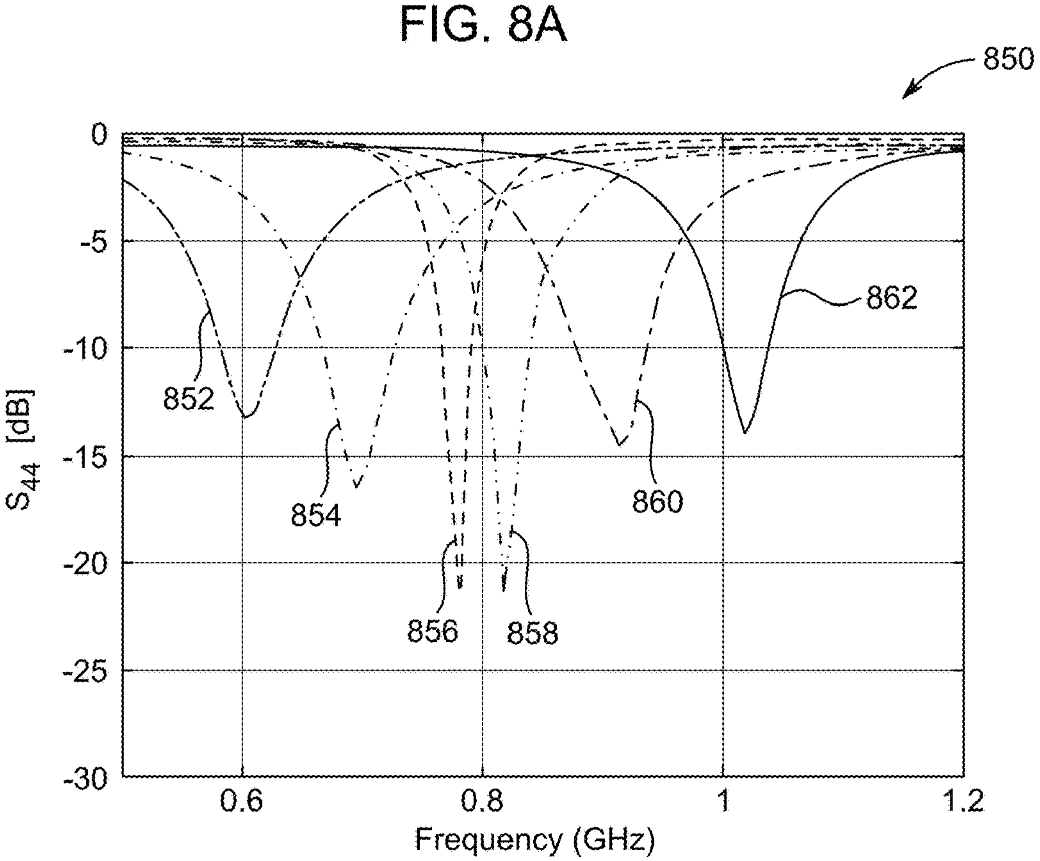
FIG. 8B is a graph of measured reflection coefficient ($S_{44}$) curves when the fourth feed port of the second narrow band antenna is excited, according to certain embodiments.

FIG. 8B is a graph 850 of measured reflection coefficient ($S_{44}$) curves when the port 4 of the second narrow band antenna 142 is excited. Signal 852 represents the measured values of $S_{44}$ when an applied voltage is 0 V. Signal 854 represents the measured values of $S_{44}$ when the applied voltage is 1 V. Signal 856 represents the measured values of $S_{44}$ when applied voltage is 2.5 V. Signal 858 represents the measured values of $S_{44}$ when applied voltage is 5 V. Signal 860 represents the measured values of $S_{44}$ when applied voltage is 10 V. Signal 862 represents the measured values of $S_{44}$ when applied voltage is 15 V.

FIG. 8A-FIG. 8B represent the measured reflection coefficients of narrowband antennas at the corresponding voltages of the above-mentioned capacitors values. The bias voltages of 15 V, 10 V, 5 V, 2.5 V, 1 V, 0 V are applied consecutively to the varactor diode for both NB antennas (the first narrow band antenna 130 and the second narrow band antenna 142) which results in the reconfigurability of the resonant frequency from 0.6 to 1 GHZ. All the reconfigurable cases have good matching.

Figure 9A:
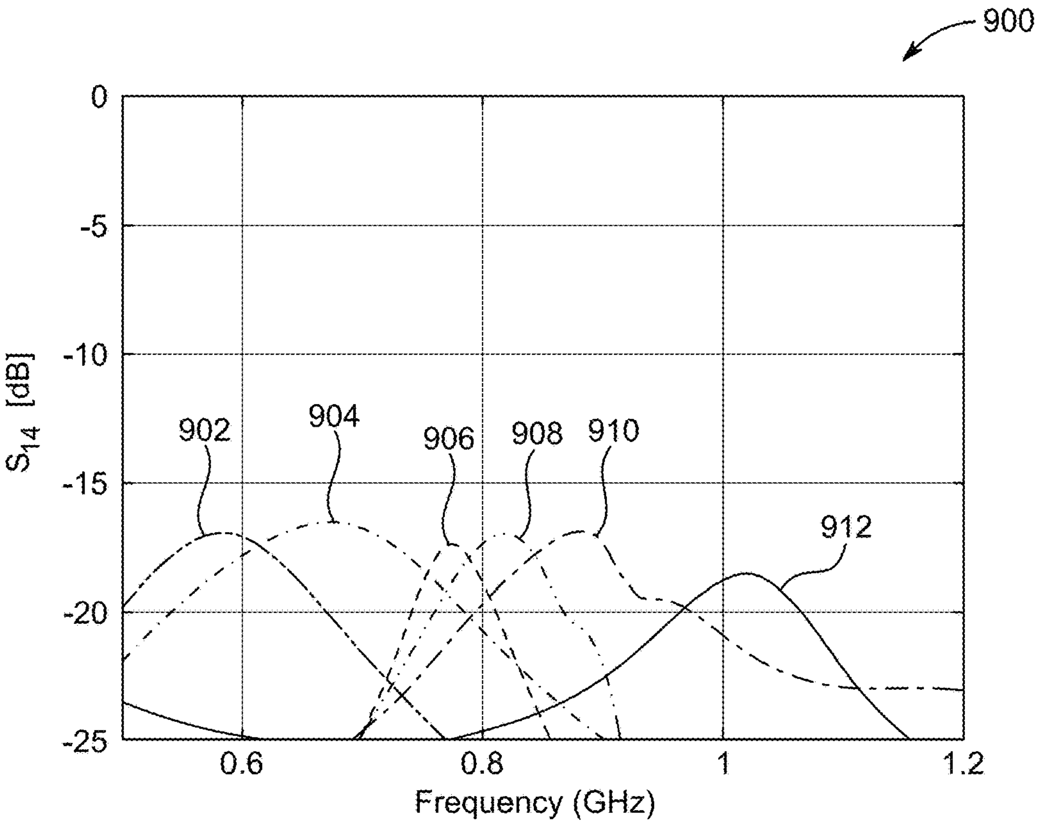
FIG. 9A is a graph of measured isolation coefficient ($S_{14}$) curves when the first feed port of the sensing antenna and the fourth feed port of the second narrow band antenna are excited, according to certain embodiments.

FIG. 9A is a graph 900 of measured isolation coefficient ($S_{14}$) curves when the port 1 of the sensing antenna and the port 4 of the second narrow band antenna 142 are excited. Signal 902 represents the measured values of isolation coefficient ($S_{14}$) when the applied voltage is 0 V. Signal 904 represents the measured values of isolation coefficient ($S_{14}$) when the applied voltage is 1 V. Signal 906 represents the measured values of isolation coefficient ($S_{14}$) when the applied voltage is 2.5 V. Signal 908 represents the measured values of isolation coefficient ($S_{14}$) when the applied voltage is 5 V. Signal 910 represents the measured values of isolation coefficient ($S_{14}$) when the applied voltage is 10 V. Signal 912 represents the measured values of isolation coefficient ($S_{14}$) when the applied voltage is 15 V.

Figure 9B:
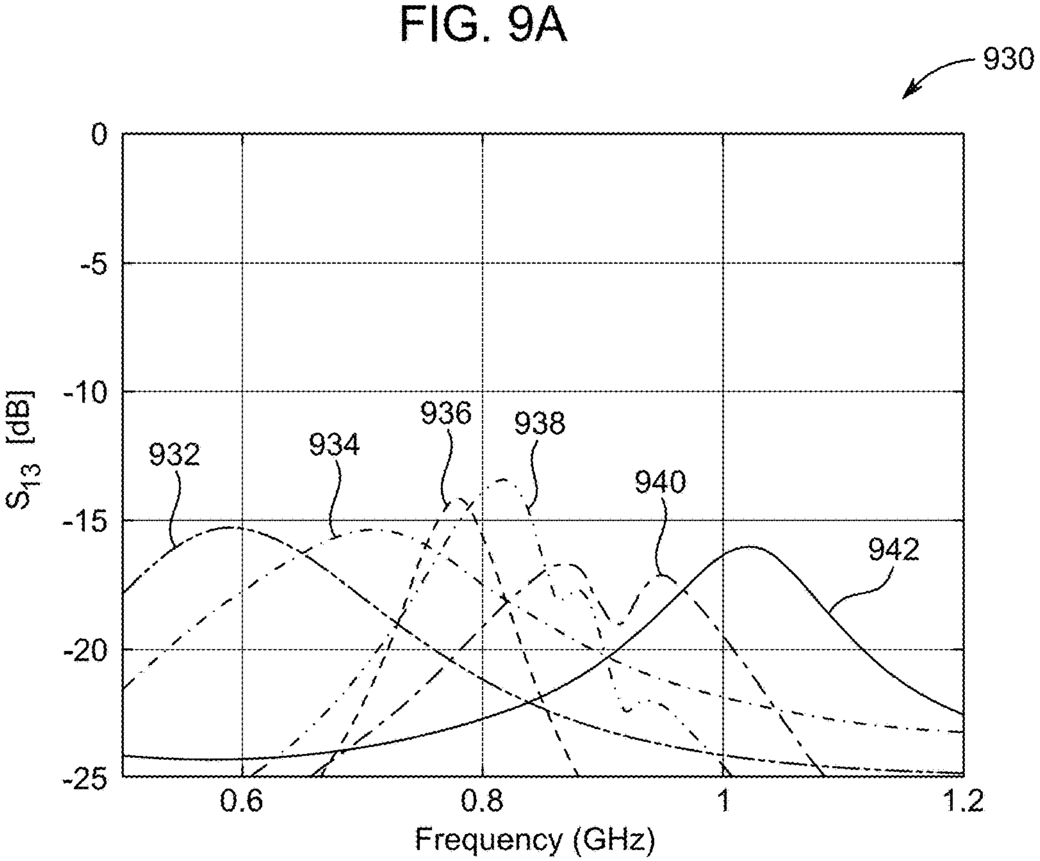
FIG. 9B is a graph of measured isolation coefficient ($S_{13}$) curves when the first feed port of the sensing antenna and the third feed port of the first narrow band antenna are excited, according to certain embodiments.

FIG. 9B is a graph 930 of measured isolation coefficient ($S_{13}$) curves when the port 1 of the sensing antenna and the port 3 of the first narrow band antenna 130 are excited. Signal 932 represents the measured values of isolation coefficient ($S_{13}$) when the applied voltage is 0 V. Signal 934 represents the measured values of isolation coefficient ($S_{13}$) when the applied voltage is 1 V. Signal 936 represents the measured values of isolation coefficient ($S_{13}$) when the applied voltage is 2.5 V. Signal 938 represents the measured values of isolation coefficient ($S_{13}$) when the applied voltage is 5 V. Signal 940 represents the measured values of isolation coefficient ($S_{13}$) when the applied voltage is 10 V. Signal 942 represents the measured values of isolation coefficient ($S_{13}$) when the applied voltage is 15 V.

Figure 9C:
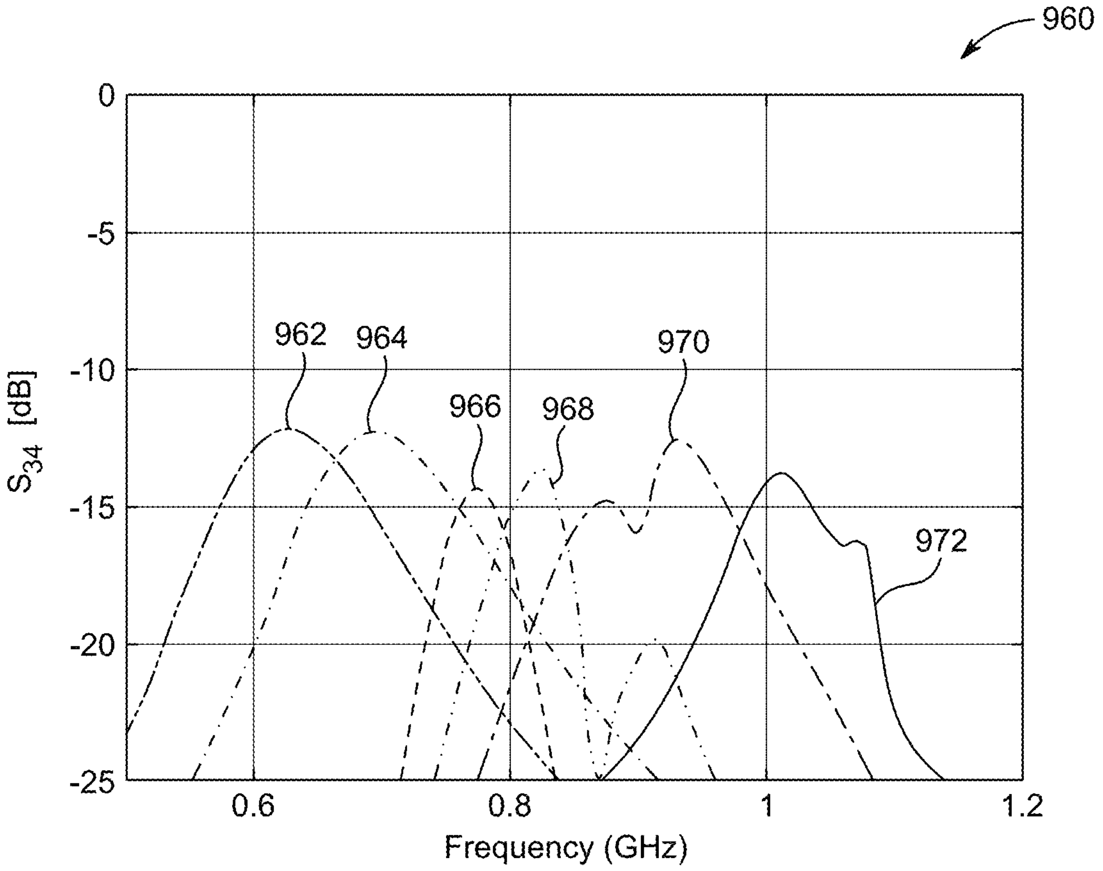
FIG. 9C is a graph of measured isolation coefficient ($S_{34}$) curves when the third feed port of the first narrow band antenna and the fourth feed port of the second narrow band antenna are excited, according to certain embodiments.

FIG. 9C is a graph 960 of measured isolation coefficient ($S_{34}$) curves when the port 3 of the first narrow band antenna 130 and the port 4 of the second narrow band antenna 142 are excited. Signal 962 represents the measured values of isolation coefficient ($S_{34}$) when the applied voltage is 0 V. Signal 964 represents the measured values of isolation coefficient ($S_{34}$) when the applied voltage is 1 V. Signal 966 represents the measured values of isolation coefficient ($S_{34}$) when the applied voltage is 2.5 V. Signal 968 represents the measured values of isolation coefficient ($S_{34}$) when the applied voltage is 5 V. Signal 970 represents the measured values of isolation coefficient ($S_{34}$) when the applied voltage is 10 V. Signal 972 represents the measured values of isolation coefficient ($S_{34}$) when the applied voltage is 15 V.

High isolation between the WB antenna and NB antennas (the first narrow band antenna 130 and the second narrow band antenna 142) have been validated in FIG. 9A and FIG. 9B respectively, with isolation factor more than 15 dB in all cases. In addition to validate the high isolation between the first narrow band antenna 130 and the port 4 of the second narrow band antenna 142 in FIG. 9C.

In an aspect, an envelope correlation coefficient (ECC) was also evaluated for the antenna. For an antenna(s) for transmitting simultaneous and independent data streams, isolation is required between the antenna(s) such that each of antenna work independently without affecting other's performance. The antennas should have good isolation, and their radiation patterns should not be same, or at least not very "correlated". To measure the isolation between the antennas, Envelope Correlation Coefficient (ECC) is calculated.

The ECC describes how independent two antennas' radiation patterns are. For example, if one antenna is completely horizontally polarized, and the other is completely vertically polarized, then the two antennas would have a correlation of zero. In similar manner, if one antenna only radiated energy towards the sky, and the other only radiated energy towards the ground, these antennas would also have an ECC of 0. The ECC is considered as an important factor for accounting the antennas' radiation pattern shape, polarization, a relative phase of the fields between the two antennas.

In an example, the patterns diversity is important for determining the lower ECC values. In the antenna 100, two antenna elements are placed orthogonal to each other to get the maximum diversity in the radiation patterns. For the antenna 100, ECC is calculated to show how much antenna elements are independent in their performance. During experiments, the values are found to be very low, less than 0.0016, ideal for the MIMO operation.

In summary, the antenna 100 is a commercial product for CubeSat operating at UHF band with several advantages as listed below:

1. Having a planar structure,
2. Not requiring any deployable mechanism,
3. Covering multiple bands,
4. Achieving wide operation bandwidth,
5. Achieving wide operation bandwidth with CP.

The first embodiment is illustrated with respect to FIG. 1A-FIG. 1F. The first embodiment describes a three element slot-based antenna 100 for use on cubic shaped satellites (Cube-Sat). The antenna 100 includes a dielectric circuit board 102, a metallic layer 120, a sensing antenna, a first narrow band antenna 130, a second narrow band antenna 142, a first tapered transmission line 152, a second tapered transmission line 160, a first microstrip transmission line 168, and a second microstrip transmission line 172. The dielectric circuit board 102 has a surface dimension of about 100 mm in length and about 100 mm in width, a top side 104, a bottom side 106, a first edge 108 opposite a second edge 110, a third edge 112 opposite a fourth edge 114, a first central axis 116 extending from the first edge 108 to the second edge 110, and a second central axis 118 extending from the third edge 112 to the fourth edge 114. The metallic layer 120 covering the bottom side 106 of the dielectric circuit board 102. The sensing antenna is located between the second central axis 118 and the second edge 110. A base of the sensing antenna is parallel to the second central axis 118 and an apex of the sensing antenna points towards the second edge 110. The sensing antenna is configured as a semi-hexagonal slot-line loop etched into the metallic layer 120. The first narrow band antenna 130 is located between the first edge 108 and the second central axis 118 and between the third edge 112 and the first central axis 116. The first narrow band antenna 130 is configured as a semi-elliptical slot-line loop having an E-shaped base etched into the metallic layer 120. The second narrow band antenna 142 located between the first edge 108 and the second central axis 118 and between the first central axis 116 and the fourth edge 114, wherein the second narrow band antenna 142 is configured as a semi-elliptical slot-line loop having an E-shaped base etched into the metallic layer 120. A gap is located in the base of the sensing antenna. The first central axis 116 passes through the gap. A capacitor is located in the gap in the base of the sensing antenna. A first varactor diode is connected across a gap in an apex of the ellipse of the first narrow band antenna 130. A second varactor diode 148 is connected across a gap in an apex of the ellipse of the second narrow band antenna 142. A first adjustable bias voltage source is operatively connected to the capacitor. A second adjustable bias voltage source is operatively connected to the first varactor diode. A third adjustable bias voltage source operatively connected to the second varactor diode 148. The first tapered transmission line 152 located on the top side above the sensing antenna and between the third edge 112 and the first central axis 116. A first end of the first tapered transmission line 152 is connected to a first feed port 158 and a second end of the first tapered transmission line 152 is oriented towards the base of the semi-hexagonal shaped slot antenna. The second tapered transmission line 160 located on the top side 104 above the sensing antenna and between the fourth edge 114 and the first central axis 116. A first end of the second tapered transmission line 160 is connected to a second feed port and a second end of the second tapered transmission line 160 is oriented towards the base of the semi-hexagonal shaped slot antenna. The first microstrip transmission line 168 located on the top side 104 and extending from the first edge 108 and above the E-shaped base of the first narrow band antenna 130. The first microstrip transmission line 168 is connected to a third feed port. The second microstrip transmission line 172 located on the top side 104 and extending from the fourth edge 114 and above the E-shaped base of the second narrow band antenna 142. The second microstrip transmission line 172 is connected to a fourth feed port. The three element slot-based antenna is configured to resonate with circular polarization in an ultra-high frequency sub-GHz range of about 570 MHz to about 950 MHz when an input signal is applied to each feed port.

In an aspect, the semi-hexagonal shaped slot antenna is configured to achieve left hand circular polarization in a bandwidth ranging from 0.57 GHz to 0.95 GHz when the input signal is connected to the first feed port 158.

In an aspect, the semi-hexagonal shaped slot antenna is configured to achieve right hand circular polarization in a bandwidth ranging from 0.57 GHz to 0.95 GHz when the input signal is connected to the second feed port.

In an aspect, semi-hexagonal slot-line loop includes a first leg, a second leg, a third leg, and a fourth leg. The first leg and the second leg is connected to form an apex of the semi-hexagonal antenna. The apex is located near the second edge 110 and intersects the first central axis 116. The third leg is connected to the first leg and configured to form a first side of the semi-hexagonal antenna. The third leg is parallel to the third edge 112. The fourth leg is connected to the second leg and configured to form a second side of the semi-hexagonal antenna, wherein the fourth leg is parallel to the fourth edge 114. The base is connected between the third leg and the fourth leg.

In an aspect, the first leg and the second leg form an angle of about 90 degrees to 140 degrees at the apex.

In an aspect, the first tapered transmission line 152 includes a transmission line segment, and a tapered segment. The transmission line segment extends from the third edge 112 to first leg of the semi-hexagonal slot-line loop. A first end of the transmission line segment is configured to connect to the first feed port 158 and has a width w1. The tapered segment having a first end connected to a second end of the transmission line segment. The first end of the tapered segment has a width w2. The w2 equals w1, and a second end which has a width w3. The w3 is about four times the width w2. The tapered segment makes an angle in the range of about 100 degrees to about 135 degrees with respect to the transmission line segment.

In an aspect, the second tapered transmission line 160 includes a transmission line segment, and a tapered segment. The transmission line segment extends from the fourth edge 114 to second leg of the semi-hexagonal slot-line loop. A first end of the transmission line segment is configured to connect to the second feed port and has a width w1. The tapered segment has a first end connected to a second end of the transmission line segment. The first end of the tapered segment has a width w2. The w2 equals w1, and a second end which has a width w3. The width w3 is about four times the width w2. The tapered segment makes an angle in the range of about minus 100 degrees to about minus 135 degrees with respect to the transmission line segment.

In an aspect, the first narrow band antenna 130 is centered about a major axis which bisects an apex of a semi-ellipse of the semi-elliptical slot-line loop of the first narrow band antenna 130. The major axis of the first narrow band antenna 130 is located between the third edge 112 and the first central axis 116 and is parallel to the first central axis 116.

In an aspect, the gap in the first narrow band antenna 130 is located at the apex of the semi-ellipse. The apex is located near the second central axis 118. The first varactor diode is connected across the gap to the metallic layer 120 enclosed by the semi-elliptical slot-line loop of the first narrow band antenna 130 and to the metallic layer 120 outside of the semi-elliptical slot-line loop of the first narrow band antenna 130.

In an aspect, the semi-elliptical slot-line loop has an E-shaped base of the first narrow band antenna 130. The semi-elliptical slot-line loop includes a semi-ellipse, a first leg, a second leg, a third leg, a fourth leg, a fifth leg, a sixth leg, a seventh leg, an eighth leg, and a ninth leg. The semi-ellipse is configured to have a first end and a second end. The first leg is connected to and perpendicular to the first end. The second leg is connected to and perpendicular to the first leg. The second leg has a length d1 and extends towards the second central axis 118. The third leg is connected to and perpendicular to the second leg. The second leg is parallel to the first leg and extends towards the third edge 112. The fourth leg connected to and perpendicular to the third leg, wherein the fourth leg has a length d2 and extends towards the first edge 108, wherein d2 is less than d1. The fifth leg connected to and perpendicular to the fourth leg, wherein the fifth leg extends towards the third edge 112. The sixth leg is connected to and perpendicular to the fifth leg. The sixth leg has a length d3, wherein d3 is equal to d2. The sixth leg extends towards the second central axis 118. The seventh leg is connected to and perpendicular to the sixth leg. The seventh leg is parallel to the first leg and extends towards the third edge 112. The eighth leg connected to and perpendicular to the seventh leg. The second leg has a length d4 and extends towards the first edge 108, wherein d4 is equal to d1. The ninth leg is connected to and perpendicular to the eighth leg and extends towards the third edge 112. The eighth leg is connected to the second end.

In an aspect, the second narrow band antenna 142 is centered about a major axis which bisects an apex of a semi-ellipse of the semi-elliptical slot-line loop of the second narrow band antenna 142. The major axis 147 of the second narrow band antenna 142 is located between the first edge 108 and the second central axis 118 and is parallel to the second central axis 118. In an aspect, the gap in the second narrow band antenna 142 is located at the apex of the semi-ellipse. The apex is located near the first central axis 116. The second varactor diode 148 is connected across the gap to the metallic layer 120 enclosed by the semi-elliptical slot-line loop of the second narrow band antenna 142 and to the metallic layer 120 outside of the semi-elliptical slot-line loop of the second narrow band antenna 142.

In an aspect, the semi-elliptical slot-line loop has an E-shaped base of the second narrow band antenna 142. The semi-elliptical slot-line loop includes a semi-ellipse, a first leg, a second leg, a third leg, a fourth leg, a fifth leg, a sixth leg, a seventh leg, an eighth leg, and a ninth leg. The semi-ellipse is configured to have a first end and a second end. The first leg is connected to and perpendicular to the first end. The second leg is connected to and perpendicular to the first leg. The second leg has a length d1 and extends towards the first central axis 116. The third leg is connected to and perpendicular to the second leg. The second leg is parallel to the first leg and extends towards the first edge 108. The fourth leg is connected to and perpendicular to the third leg. The fourth leg has a length d2 and extends towards the fourth edge 114, wherein d2 is less than d1. The fifth leg is connected to and perpendicular to the fourth leg. The fifth leg extends towards the first edge 108. The sixth leg is connected to and perpendicular to the fifth leg. The sixth leg has a length d3, wherein d3 is equal to d2. The sixth leg extends towards the first central axis 116. The seventh leg is connected to and perpendicular to the sixth leg. The seventh leg is parallel to the first leg and extends towards the first edge 108. The eighth leg is connected to and perpendicular to the seventh leg. The second leg has a length d4 and extends towards the fourth edge 114. The d4 is equal to d1. The ninth leg is connected to and perpendicular to the eighth leg and extends towards the first edge 108. The eighth leg is connected to the second end.

The second embodiment is illustrated with respect to FIG. 1A-FIG. 1F. The second embodiment describes a method for transmitting ultra-high frequency signals with a three element slot-based antenna. The method includes connecting an input signal to each of a first port, a second port, a third port and a fourth feed port located on the three element slot-based antenna. The three element slot-based antenna includes a dielectric circuit board 102 having a surface dimension of about 100 mm in length and about 100 mm in width, a top side 104, a bottom side 106, a first edge 108 opposite a second edge 110, a third edge 112 opposite a fourth edge 114, a first central axis 116 extending from the first edge 108 to the second edge 110, and a second central axis 118 extending from the third edge 112 to the fourth edge 114; a metallic layer 120 covering the bottom side 106 of the dielectric circuit board 102; a sensing antenna located between the second central axis 118 and the second edge 110, wherein a base of the sensing antenna is parallel to the second central axis 118 and an apex of the sensing antenna points towards the second edge 110, wherein the sensing antenna is configured as a semi-hexagonal slot-line loop etched into the metallic layer 120; a first narrow band antenna 130 located between the first edge 108 and the second central axis 118 and between the third edge 112 and the first central axis 116, wherein the first narrow band antenna 130 is configured as a semi-elliptical slot-line loop having an E-shaped base etched into the metallic layer 120; a second narrow band antenna 142 located between the first edge 108 and the second central axis 118 and between the first central axis 116 and the fourth edge 114, wherein the second narrow band antenna 142 is configured as a semi-elliptical slot-line loop having an E-shaped base etched into the metallic layer 120; a gap located in the base of the sensing antenna, wherein the first central axis 116 passes through the gap; a capacitor located in the gap in the base of the sensing antenna; a first varactor diode connected across a gap in an apex of the ellipse of the first narrow band antenna 130; a second varactor diode 148 connected across a gap in an apex of the ellipse of the second narrow band antenna 142; a first adjustable bias voltage source operatively connected to the capacitor; a second adjustable bias voltage source operatively connected to the first varactor diode; and a third adjustable bias voltage source operatively connected to the second varactor diode 148, a first tapered transmission line 152 located on the top side 104 above the sensing antenna and between the third edge 112 and the first central axis 116, wherein a first end of the first tapered transmission line 152 is connected to a first feed port 158 and a second end of the first tapered transmission line 152 is oriented towards the base of the semi-hexagonal shaped slot antenna; a second tapered transmission line 160 located on the top side 104 above the sensing antenna and between the fourth edge 114 and the first central axis 116, wherein a first end of the second tapered transmission line 160 is connected to a second feed port and a second end of the second tapered transmission line 160 is oriented towards the base of the semi-hexagonal shaped slot antenna; a first microstrip transmission line 168 located on the top side 104 and extending from the first edge 108 and above the E-shaped base of the first narrow band antenna 130, wherein the first microstrip transmission line 168 is connected to a third feed port; and a second microstrip transmission line 172 located on the top side 104 and extending from the fourth edge 114 and above the E-shaped base of the second narrow band antenna 142, wherein the second microstrip transmission line 172 is connected to a fourth feed port. The method includes tuning the sensing antenna by adjusting the first adjustable bias voltage on the capacitor to cause the sensing antenna to achieve circular polarization in a bandwidth ranging from 0.57 GHz to 0.95 GHz. The method includes tuning the first narrow band antenna 130 by adjusting the second adjustable bias voltage on the first varactor diode to achieve left hand elliptical polarization in the bandwidth ranging from 0.57 GHz to 0.95 GHz. The method includes tuning the second narrow band antenna 142 by adjusting the third adjustable bias voltage on the second varactor diode 148 to achieve right hand elliptical polarization in the bandwidth ranging from 0.57 GHz to 0.95 GHz.

In an aspect, the method further includes transmitting ultra-high frequency signals from the semi-hexagonal shaped slot antenna with left hand circular polarization when the input signal is connected to the first feed port 158.

In an aspect, the method further includes transmitting ultra-high frequency signals from the semi-hexagonal shaped slot antenna with right hand circular polarization when the input signal is connected to the second feed port.

In an aspect, the method further includes selecting the resonant frequency of the sensing antenna by selecting a value of the capacitor from a range of about 0.3 μF to about 1.10 μF.

In an aspect, the method further includes selecting the resonant frequency of each narrow band antenna by selecting a capacitance value of each varactor diode from a range of about 0.8 pF to 5.08 μF.

The third embodiment is illustrated with respect to FIG. 1A-FIG. 1F. The third embodiment describes a method for forming a three element slot-based antenna for use on cubic shaped satellites (Cube-Sat) communicating at ultra-high frequencies. The method includes obtaining a dielectric circuit board 102 having a surface dimension of about 100 mm in length and about 100 mm in width, a top side 104, a bottom side 106, a first edge 108 opposite a second edge 110, a third edge 112 opposite a fourth edge 114, a first central axis 116 extending from the first edge 108 to the second edge 110, and a second central axis 118 extending from the third edge 112 to the fourth edge 114. The method includes covering the bottom side 106 of the dielectric circuit board 102 with a metallic layer 120. The method includes etching a sensing antenna, by laser milling a semi-hexagonal slot-line loop into the metallic layer 120 between the second central axis 118 and the second edge 110, wherein a base of the semi-hexagonal slot-line loop is parallel to the second central axis 118 and an apex of the semi-hexagonal slot-line loop points towards the second edge 110. The method includes etching a first narrow band antenna 130, by laser milling a first semi-elliptical slot-line loop having an E-shaped base into the metallic layer 120 between the first edge 108 and the second central axis 118 and between the third edge 112 and the first central axis 116, so that an apex of the first semi-ellipse points towards the second central axis 118. The method includes etching a second narrow band antenna 142, by laser milling a second semi-elliptical slot-line loop having an E-shaped base into the metallic layer 120 between the first edge 108 and the second central axis 118 and between the first central axis 116 and the fourth edge 114, so that an apex of the second semi-ellipse points towards the first central axis 116. The method includes connecting a capacitor across a gap in the base of the sensing antenna. The method includes forming a first adjustable bias voltage circuit on the bottom side 106 and operatively connecting the first adjustable bias voltage circuit to the capacitor through a first shorting post 127 which extends from the top side 104 to the metallic layer 120 enclosed by the semi-hexagonal slot-line loop. The method includes forming a second adjustable bias voltage circuit on the bottom side 106 and operatively connecting the second adjustable bias voltage circuit to the first varactor through a second shorting post 139 which extends from the top side 104 to the metallic layer 120 enclosed by the semi-elliptical slot-line loop having an E-shaped base of the first narrow-band antenna. The method includes forming a third adjustable bias voltage circuit on the bottom side 106 and operatively connecting the third adjustable bias voltage circuit to the second varactor through a third shorting post 149 which extends from the top side 104 to the metallic layer 120 enclosed by semi-elliptical slot-line loop having an E-shaped base of the second narrowband antenna. The method includes printing a first tapered transmission line on the top side 104 above the sensing antenna and between the third edge 112 and the first central axis 116, wherein a second end of the first tapered transmission line 152 is oriented towards the base of the semi-hexagonal shaped slot antenna. The method further includes connecting a first end of the first tapered transmission line to a first feed port 158. The method further includes depositing a second tapered transmission line on the top side 104 above the sensing antenna and between the fourth edge 114 and the first central axis 116, wherein a second end of the second tapered transmission line is oriented towards the base of the semi-hexagonal shaped slot antenna. The method further includes connecting a first end of the second tapered transmission line to a second feed port. The method further includes depositing a first microstrip transmission line on the top side 104, wherein the first microstrip transmission line extends from the first edge 108 to above the E-shaped base of the first narrow band antenna 130. The method further includes connecting the first microstrip transmission line to a third feed port. The method further includes depositing a second microstrip transmission line located on the top side 104 and extending from the fourth edge 114 and above the E-shaped base of the second narrow band antenna 142, wherein the second microstrip transmission line is connected to a fourth feed port. The method further includes connecting the first feed port 158, the second feed port, the third feed port and the fourth feed port to an input signal.

In an aspect, the method further includes tuning the sensing antenna by adjusting the first adjustable bias voltage on the capacitor to cause the sensing antenna to achieve circular polarization in a bandwidth ranging from 0.57 GHz to 0.95 GHz. The method further includes tuning the first narrow band antenna 130 by adjusting the second adjustable bias voltage on the first varactor diode to achieve left hand elliptical polarization in the bandwidth ranging from 0.57 GHz to 0.95 GHz. The method further includes tuning the second narrow band antenna 142 by adjusting the third adjustable bias voltage on the second varactor diode 148 to achieve right hand elliptical polarization in the bandwidth ranging from 0.57 GHz to 0.95 GHz.

Numerous modifications and variations of the present disclosure are possible in light of the above teachings. It is therefore to be understood that within the scope of the appended claims, the invention may be practiced otherwise than as specifically described herein.

The invention claimed is:

1. A three element slot-based antenna for use on cubic shaped satellites (Cube-Sat), comprising:
  - a dielectric circuit board having a surface dimension of about 100 mm in length and about 100 mm in width, a top side, a bottom side, a first edge opposite a second edge, a third edge opposite a fourth edge, a first central axis extending from the first edge to the second edge, and a second central axis extending from the third edge to the fourth edge;
  - a metallic layer covering the bottom side of the dielectric circuit board;
  - a sensing antenna located between the second central axis and the second edge, wherein a base of the sensing antenna is parallel to the second central axis and an apex of the sensing antenna points towards the second edge, wherein the sensing antenna is configured as a semi-hexagonal slot-line loop etched into the metallic layer;
  - a first narrow band antenna located between the first edge and the second central axis and between the third edge and the first central axis, wherein the first narrow band antenna is configured as a semi-elliptical slot-line loop having an E-shaped base etched into the metallic layer;
  - a second narrow band antenna located between the first edge and the second central axis and between the first central axis and the fourth edge, wherein the second narrow band antenna is configured as a semi-elliptical slot-line loop having an E-shaped base etched into the metallic layer;
  - a gap located in the base of the sensing antenna, wherein the first central axis passes through the gap;
  - a capacitor located in the gap in the base of the sensing antenna;
  - a first varactor diode connected across a gap in an apex of the ellipse of the first narrow band antenna;
  - a second varactor diode connected across a gap in an apex of the ellipse of the second narrow band antenna;

a first adjustable bias voltage source operatively connected to the capacitor;

a second adjustable bias voltage source operatively connected to the first varactor diode; and a third adjustable bias voltage source operatively connected to the second varactor diode, a first tapered transmission line located on the top side above the sensing antenna and between the third edge and the first central axis, wherein a first end of the first tapered transmission line is connected to a first feed port and a second end of the first tapered transmission line is oriented towards the base of the semi-hexagonal shaped slot antenna;

a second tapered transmission line located on the top side above the sensing antenna and between the fourth edge and the first central axis, wherein a first end of the second tapered transmission line is connected to a second feed port and a second end of the second tapered transmission line is oriented towards the base of the semi-hexagonal shaped slot antenna;

a first microstrip transmission line located on the top side and extending from the first edge and above the E-shaped base of the first narrow band antenna, wherein the first microstrip transmission line is connected to a third feed port; and a second microstrip transmission line located on the top side and extending from the fourth edge and above the E-shaped base of the second narrow band antenna, wherein the second microstrip transmission line is connected to a fourth feed port, wherein the three element slot-based antenna is configured to resonate with circular polarization in an ultra-high frequency sub-GHz range of from about 570 MHz to about 950 MHz when an input signal is applied to each feed port.

2. The three element slot-based antenna of claim 1, wherein the semi-hexagonal shaped slot antenna is configured to achieve left hand circular polarization in a bandwidth ranging from 0.57 GHz to 0.95 GHz when the input signal is connected to the first feed port.

3. The three element slot-based antenna of claim 1, wherein the semi-hexagonal shaped slot antenna is configured to achieve right hand circular polarization in a bandwidth ranging from 0.57 GHz to 0.95 GHz when the input signal is connected to the second feed port.

4. The three element slot-based antenna of claim 1, wherein the semi-hexagonal slot-line loop comprises:

a first leg and a second leg connected to form an apex of the semi-hexagonal antenna, where the apex is located near the second edge and intersects the first central axis;

a third leg connected to the first leg and configured to form a first side of the semi-hexagonal antenna, wherein the third leg is parallel to the third edge;

a fourth leg connected to the second leg and configured to form a second side of the semi-hexagonal antenna, wherein the fourth leg is parallel to the fourth edge; and the base connected between the third leg and the fourth leg.

5. The three element slot-based antenna of claim 4, wherein the first leg and the second leg form an angle of about 90 degrees to 140 degrees at the apex.

6. The three element slot-based antenna of claim 4, wherein the first tapered transmission line comprises:

a transmission line segment which extends from the third edge to first leg of the semi-hexagonal slot-line loop, wherein a first end of the transmission line segment is configured to connect to the first feed port and has a width w1; and a tapered segment having a first end connected to a second end of the transmission line segment, wherein the first end of the tapered segment has a width w2, wherein w2 equals w1, and a second end which has a width w3, wherein w3 is about four times the width w2, wherein the tapered segment makes an angle in the range of about 100 degrees to about 135 degrees with respect to the transmission line segment.

7. The three element slot-based antenna of claim 4, wherein the second tapered transmission line comprises:

a transmission line segment which extends from the fourth edge to second leg of the semi-hexagonal slot-line loop, wherein a first end of the transmission line segment is configured to connect to the second feed port and has a width w1; and a tapered segment having a first end connected to a second end of the transmission line segment, wherein the first end of the tapered segment has a width w2, wherein w2 equals w1, and a second end which has a width w3, wherein w3 is about four times the width w2, wherein the tapered segment makes an angle in the range of about minus 100 degrees to about minus 135 degrees with respect to the transmission line segment.

8. The three element slot-based antenna of claim 1, wherein the first narrow band antenna is centered about a major axis which bisects an apex of a semi-ellipse of the semi-elliptical slot-line loop of the first narrow band antenna, wherein the major axis of the first narrow band antenna is located between the third edge and the first central axis and is parallel to the first central axis.

9. The three element slot-based antenna of claim 8, wherein:

the gap in the first narrow band antenna is located at the apex of the semi-ellipse;

the apex is located near the second central axis; and the first varactor diode is connected across the gap to the metallic layer enclosed by the semi-elliptical slot-line loop of the first narrow band antenna and to the metallic layer outside of the semi-elliptical slot-line loop of the first narrow band antenna.

10. The three element slot-based antenna of claim 8, wherein the semi-elliptical slot-line loop having an E-shaped base of the first narrow band antenna comprises:

the semi-ellipse, wherein the semi-ellipse is configured to have a first end and a second end;

a first leg connected to and perpendicular to the first end;

a second leg connected to and perpendicular to the first leg, wherein the second leg has a length d1 and extends towards the second central axis;

a third leg connected to and perpendicular to the second leg, wherein the third leg is parallel to the first leg and extends towards the fourth edge;

a fourth leg connected to and perpendicular to the third leg, wherein the fourth leg has a length d2 and extends towards the first edge, wherein d2 is less than d1;

a fifth leg connected to and perpendicular to the fourth leg, wherein the fifth leg extends towards the third edge;

a sixth leg connected to and perpendicular to the fifth leg, wherein the sixth leg has a length d3, wherein d3 is equal to d2, wherein the sixth leg extends towards the second central axis;

a seventh leg connected to and perpendicular to the sixth leg, wherein the seventh leg is parallel to the first leg and extends towards the fourth edge;

an eighth leg connected to and perpendicular to the seventh leg, wherein the eighth leg has a length d4 and extends towards the first edge, wherein d4 is equal to d1; and a ninth leg connected to and perpendicular to the eighth leg and extends towards the third edge, wherein the ninth leg is connected to the second end.

11. The three element slot-based antenna of claim 1, wherein the second narrow band antenna is centered about a major axis which bisects an apex of a semi-ellipse of the semi-elliptical slot-line loop of the second narrow band antenna, wherein the major axis of the second narrow band antenna is located between the first edge and the second central axis and is parallel to the second central axis.

12. The three element slot-based antenna of claim 11, wherein:

the gap in the second narrow band antenna is located at the apex of the semi-ellipse;

the apex is located near the first central axis; and the second varactor diode is connected across the gap to the metallic layer enclosed by the semi-elliptical slot-line loop of the second narrow band antenna and to the metallic layer outside of the semi-elliptical slot-line loop of the second narrow band antenna.

13. The three element slot-based antenna of claim 11, wherein the semi-elliptical slot-line loop having an E-shaped base of the second narrow band antenna comprises:

the semi-ellipse, wherein the semi-ellipse is configured to have a first end and a second end;

a first leg connected to and perpendicular to the first end;

a second leg connected to and perpendicular to the first leg, wherein the second leg has a length d1 and extends towards the first central axis;

a third leg connected to and perpendicular to the second leg, wherein the third leg is parallel to the first leg and extends towards the first edge;

a fourth leg connected to and perpendicular to the third leg, wherein the fourth leg has a length d2 and extends towards the fourth edge, wherein d2 is less than d1;

a fifth leg connected to and perpendicular to the fourth leg, wherein the fifth leg extends towards the first edge;

a sixth leg connected to and perpendicular to the fifth leg, wherein the sixth leg has a length d3, wherein d3 is equal to d2, wherein the sixth leg extends towards the first central axis;

a seventh leg connected to and perpendicular to the sixth leg, wherein the seventh leg is parallel to the first leg and extends towards the first edge;

an eighth leg connected to and perpendicular to the seventh leg, wherein the eighth leg has a length d4 and extends towards the fourth edge, wherein d4 is equal to d1; and a ninth leg connected to and perpendicular to the eighth leg and extends towards the first edge, wherein the ninth leg is connected to the second end.

14. A method for transmitting ultra-high frequency signals with a three element slot-based antenna, comprising:

connecting an input signal to each of a first port, a second port, a third port and a fourth feed port located on the three element slot-based antenna, wherein the three element slot-based antenna includes:

a dielectric circuit board having a surface dimension of about 100 mm in length and about 100 mm in width, a top side, a bottom side, a first edge opposite a second edge, a third edge opposite a fourth edge, a first central axis extending from the first edge to the second edge, and a second central axis extending from the third edge to the fourth edge;

a metallic layer covering the bottom side of the dielectric circuit board;

a sensing antenna located between the second central axis and the second edge, wherein a base of the sensing antenna is parallel to the second central axis and an apex of the sensing antenna points towards the second edge, wherein the sensing antenna is configured as a semi-hexagonal slot-line loop etched into the metallic layer;

a first narrow band antenna located between the first edge and the second central axis and between the third edge and the first central axis, wherein the first narrow band antenna is configured as a semi-elliptical slot-line loop having an E-shaped base etched into the metallic layer;

a second narrow band antenna located between the first edge and the second central axis and between the first central axis and the fourth edge, wherein the second narrow band antenna is configured as a semi-elliptical slot-line loop having an E-shaped base etched into the metallic layer;

a gap located in the base of the sensing antenna, wherein the first central axis passes through the gap;

a capacitor located in the gap in the base of the sensing antenna;

a first varactor diode connected across a gap in an apex of the ellipse of the first narrow band antenna;

a second varactor diode connected across a gap in an apex of the ellipse of the second narrow band antenna;

a first adjustable bias voltage source operatively connected to the capacitor;

a second adjustable bias voltage source operatively connected to the first varactor diode; and a third adjustable bias voltage source operatively connected to the second varactor diode, a first tapered transmission line located on the top side above the sensing antenna and between the third edge and the first central axis, wherein a first end of the first tapered transmission line is connected to a first feed port and a second end of the first tapered transmission line is oriented towards the base of the semi-hexagonal shaped slot antenna;

a second tapered transmission line located on the top side above the sensing antenna and between the fourth edge and the first central axis, wherein a first end of the second tapered transmission line is connected to a second feed port and a second end of the second tapered transmission line is oriented towards the base of the semi-hexagonal shaped slot antenna;

a first microstrip transmission line located on the top side and extending from the first edge and above the E-shaped base of the first narrow band antenna, wherein the first microstrip transmission line is connected to a third feed port; and a second microstrip transmission line located on the top side and extending from the fourth edge and above the E-shaped base of the second narrow band antenna, wherein the second microstrip transmission line is connected to a fourth feed port;

tuning the sensing antenna by adjusting the first adjustable bias voltage on the capacitor to cause the sensing antenna to achieve circular polarization in a bandwidth ranging from 0.57 GHz to 0.95 GHZ;

tuning the first narrow band antenna by adjusting the second adjustable bias voltage on the first varactor diode to achieve left hand elliptical polarization in the bandwidth ranging from 0.57 GHz to 0.95 GHz; and tuning the second narrow band antenna by adjusting the third adjustable bias voltage on the second varactor diode to achieve right hand elliptical polarization in the bandwidth ranging from 0.57 GHz to 0.95 GHz.

15. The method of claim 14, further comprising:

transmitting ultra-high frequency signals from the semi-hexagonal shaped slot antenna with left hand circular polarization when the input signal is connected to the first feed port.

16. The method of claim 14, further comprising:

transmitting ultra-high frequency signals from the semi-hexagonal shaped slot antenna with right hand circular polarization when the input signal is connected to the second feed port.

17. The method of claim 14, further comprising:

selecting the resonant frequency of the sensing antenna by selecting a value of the capacitor from a range of about 0.3 μF to about 1.10 μF.

18. The method of claim 14, further comprising:

selecting the resonant frequency of each narrow band antenna by selecting a capacitance value of each varactor diode from a range of about 0.8 μF to 5.08 μF.

19. A method for forming a three element slot-based antenna for use on cubic shaped satellites (Cube-Sat) communicating at ultra-high frequencies, comprising:

obtaining a dielectric circuit board having a surface dimension of about 100 mm in length and about 100 mm in width, a top side, a bottom side, a first edge opposite a second edge, a third edge opposite a fourth edge, a first central axis extending from the first edge to the second edge, and a second central axis extending from the third edge to the fourth edge;

covering the bottom side of the dielectric circuit board with a metallic layer;

etching a sensing antenna, by laser milling a semi-hexagonal slot-line loop into the metallic layer between the second central axis and the second edge, wherein a base of the semi-hexagonal slot-line loop is parallel to the second central axis and an apex of the semi-hexagonal slot-line loop points towards the second edge;

etching a first narrow band antenna, by laser milling a first semi-elliptical slot-line loop having an E-shaped base into the metallic layer between the first edge and the second central axis and between the third edge and the first central axis, so that an apex of the first semi-ellipse points towards the second central axis;

etching a second narrow band antenna, by laser milling a second semi-elliptical slot-line loop having an E-shaped base into the metallic layer between the first edge and the second central axis and between the first central axis and the fourth edge, so that an apex of the second semi-ellipse points towards the first central axis;

connecting a capacitor across a gap in the base of the sensing antenna;

forming a first adjustable bias voltage circuit on the top side and operatively connecting the first adjustable bias voltage circuit to the capacitor through a first shorting post which extends from the top side to the metallic layer enclosed by the semi-hexagonal slot-line loop;

forming a second adjustable bias voltage circuit on the top side and operatively connecting the second adjustable bias voltage circuit to the first varactor diode through a second shorting post which extends from the top side to the metallic layer enclosed by the semi-elliptical slot-line loop having an E-shaped base of the first narrow-band antenna;

forming a third adjustable bias voltage circuit on the bottom side and operatively connecting the third adjustable bias voltage circuit to the second varactor diode through a third shorting post which extends from the top side to the metallic layer enclosed by semi-elliptical slot-line loop having an E-shaped base of the second narrowband antenna;

printing a first conductive tapered transmission line on the top side above the sensing antenna and between the third edge and the first central axis, wherein a second end of the first tapered transmission line is oriented towards the base of the semi-hexagonal shaped slot antenna;

connecting a first end of the first conductive tapered transmission line to a first feed port;

printing a second conductive tapered transmission line on the top side above the sensing antenna and between the fourth edge and the first central axis, wherein a second end of the second conductive tapered transmission line is oriented towards the base of the semi-hexagonal shaped slot antenna;

connecting a first end of the second conductive tapered transmission line to a second feed port;

printing a first conductive microstrip transmission line on the top side, wherein the first conductive microstrip transmission line extends from the first edge to above the E-shaped base of the first narrow band antenna;

connecting the first conductive microstrip transmission line to a third feed port; and printing a second conductive microstrip transmission line located on the top side and extending from the fourth edge and above the E-shaped base of the second narrow band antenna, wherein the second conductive microstrip transmission line is connected to a fourth feed port; and connecting the first feed port, the second feed port, the third feed port and the fourth feed port to an input signal.

20. The method of claim 19, further comprising:

tuning the sensing antenna by adjusting the first adjustable bias voltage on the capacitor to cause the sensing antenna to achieve circular polarization in a bandwidth ranging from 0.57 GHz to 0.95 GHz;

tuning the first narrow band antenna by adjusting the second adjustable bias voltage on the first varactor diode to achieve left hand elliptical polarization in the bandwidth ranging from 0.57 GHz to 0.95 GHz; and tuning the second narrow band antenna by adjusting the third adjustable bias voltage on the second varactor diode to achieve right hand elliptical polarization in the bandwidth ranging from 0.57 GHz to 0.95 GHz.

* * * * *